(12) United States Patent
Chen et al.

(10) Patent No.: US 10,163,003 B2
(45) Date of Patent: Dec. 25, 2018

(54) RECOGNIZING COMBINATIONS OF BODY SHAPE, POSE, AND CLOTHING IN THREE-DIMENSIONAL INPUT IMAGES

(71) Applicant: Adobe Systems Incorporated, San Jose, CA (US)

(72) Inventors: Zhili Chen, Columbus, OH (US); Duygu Ceylan, Mountain View, CA (US); Byungmoon Kim, Sunnyvale, CA (US); Liwen Hu, Los Angeles, CA (US); Jimei Yang, Santa Clara, CA (US)

(73) Assignee: Adobe Systems Incorporated, San Jose, CA (US)

( * ) Notice: Subject to any disclaimer, the term of this patent is extended or adjusted under 35 U.S.C. 154(b) by 121 days.

(21) Appl. No.: 15/392,597

(22) Filed: Dec. 28, 2016

(65) Prior Publication Data
US 2018/0181802 A1    Jun. 28, 2018

(51) Int. Cl.
*G06K 9/62* (2006.01)
*G06K 9/00* (2006.01)
*G06T 7/73* (2017.01)

(52) U.S. Cl.
CPC ............ *G06K 9/00369* (2013.01); *G06T 7/73* (2017.01); *G06T 2207/10012* (2013.01); *G06T 2207/20081* (2013.01); *G06T 2207/20084* (2013.01)

(58) Field of Classification Search
CPC ... G06T 2207/20081; G06T 2207/3019; G06T 2207/20084; G06T 2207/30244;
(Continued)

(56) References Cited

U.S. PATENT DOCUMENTS

| 9,361,543 | B2 * | 6/2016 | Schertler | G06K 9/6256 |
| 2010/0111370 | A1 * | 5/2010 | Black | G06K 9/00369 |
| | | | | 382/111 |
| 2016/0104070 | A1 * | 4/2016 | Eslami | G06N 5/04 |
| | | | | 706/12 |

OTHER PUBLICATIONS

Lee et al.; "Boby part detection for human pose estimation and tracking"; Dec. 23-24, 2007; IEEE workshop on motion and video computing.*

(Continued)

*Primary Examiner* — Eueng-Nan Yeh
(74) *Attorney, Agent, or Firm* — Kilpatrick Townsend & Stockton LLP

(57) ABSTRACT

Certain embodiments involve recognizing combinations of body shape, pose, and clothing in three-dimensional input images. For example, synthetic training images are generated based on user inputs. These synthetic training images depict different training figures with respective combinations of a body pose, a body shape, and a clothing item. A machine learning algorithm is trained to recognize the pose-shape-clothing combinations in the synthetic training images and to generate feature descriptors describing the pose-shape-clothing combinations. The trained machine learning algorithm is outputted for use by an image manipulation application. In one example, an image manipulation application uses a feature descriptor, which is generated by the machine learning algorithm, to match an input figure in an input image to an example image based on a correspondence between a pose-shape-clothing combination of the input figure and a pose-shape-clothing combination of an example figure in the example image.

20 Claims, 12 Drawing Sheets

(58) Field of Classification Search
CPC .. G06T 7/246; G06T 7/70; G06T 7/73; G06T 7/75; G06T 7/33; G06T 7/344; G06K 9/629
See application file for complete search history.

(56) References Cited

OTHER PUBLICATIONS

Navaratnam et al.; "Hierarchical part-based human body pose estimation"; Sep. 2005; Proceedings of the british machine vision conference.*

Ye, M., Wang, X., Yang, R., Ren, L., Pollefeys, M., Accurate 3D Pose Estimation From a Single Depth Image, in ICCV '11 Proceedings of the 2011 International Conference on Computer Vision, Nov. 2011, 8 pages.

Toshev, A., Szegedy, C., Deep Pose: Human Pose Estimation via Deep Neural Networks, CVPR '14 Proceedings of the 2014 IEEE Conference on Computer Vision and Pattern Recognition, Jun. 2014, 8 pages.

Hornung, A., Dekkers, E., Kobbelt, L., Character Animation from 2D Pictures and 3D Motion Data, ACM Trans. Graph, 26, 1 Article, Jan. 2007, 9 pages.

Bogo, B., Black, M., Loper, M., Romero, J., Detailed Body Shape and Pose from RGB-D Sequences, in ICCV '11 Proceedings International Conference on Computer Vision, Dec. 2015, 9 pages.

Adobe, Animated 3DCharacters. No 3D Knowledge Required, https://www.mixamo.com/, accessed Dec. 16, 2016, 7 pages.

Muller, M., Heidelberger, B., Hennix, M., and Ratcliff, J., Position Based Dynamics, . Journal of Visual. Communication and Image Representation, vol. 18, Issue 2, Apr. 2007, 10 pages.

Kulkarni, T. D., Whitney, W. F., Kohli, P., and Tenenbaum, J., Deep Convolutional Inverse Graphics Network, in Advances in Neural Information Processing Systems 28, Conference, Dec. 2015, 9 pages.

* cited by examiner

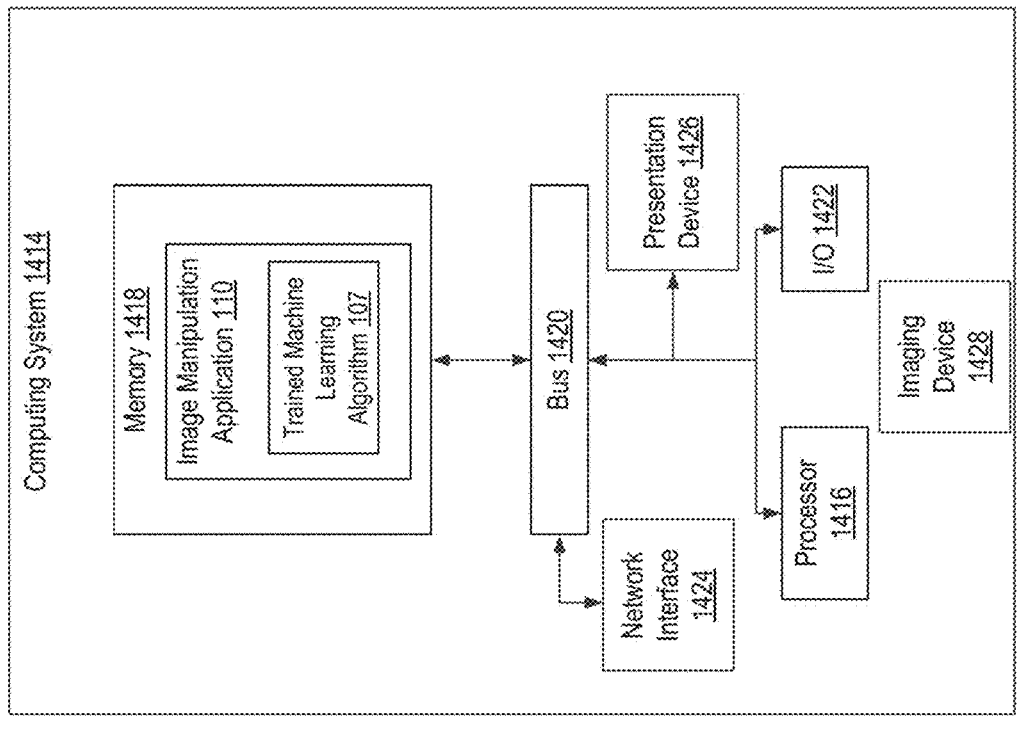
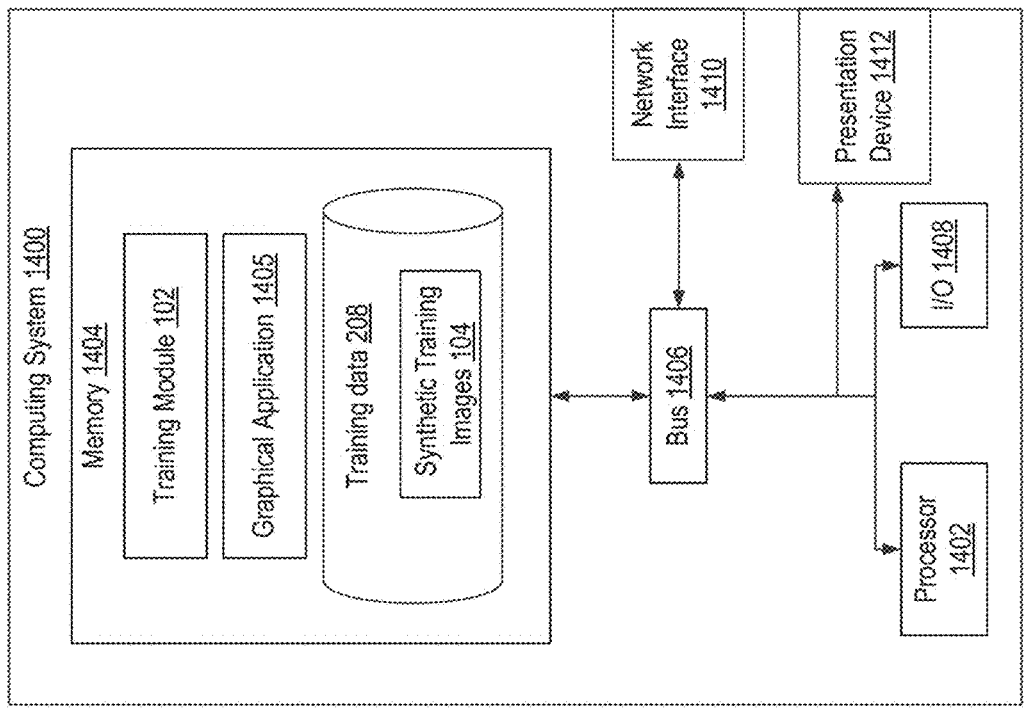
FIG. 14

RECOGNIZING COMBINATIONS OF BODY SHAPE, POSE, AND CLOTHING IN THREE-DIMENSIONAL INPUT IMAGES

TECHNICAL FIELD

This disclosure relates generally to artificial intelligence used in image processing. More specifically, but not by way of limitation, this disclosure relates to training machine-learning algorithms to match input images to example images based on combinations of body shape, pose, and clothing, which thereby allows image-processing applications to accurately estimate the body shape and pose of a clothed figure in a three-dimensional scan or other input image.

BACKGROUND

Digital avatars are used in various digital applications, such as virtual environment platforms and social media services. A digital avatar is a virtual representation of a user. Examples of avatars include three-dimensional ("3D") depictions of human beings or other objects. The various digital applications allow users to modify the appearance or behavior of their avatars. Examples of modifications to digital avatars include animating the avatars, applying different "clothing" graphics to the avatars (i.e., "dressing" and "re-dressing" the avatars), etc.

In some examples, avatars are generated by performing a 3D scan of a human being or other object. For instance, various scanning methods use depth sensors to generate a depth map of the human being or other object. The depth map is used to generate an avatar of a person. But disadvantages are associated with these existing solutions for generating digital avatars.

In one example, existing scanning methods treat the scanned human being as a single static object. In this single static object, no distinction is made between the person's clothing and the shape or pose (e.g. sitting, standing) of the person's body. Thus, these methods fail to provide information regarding the body shape or the body pose, and these methods also fail to distinguish between features of the person's body and the person's clothing. As a result, a virtual environment platform or other application is unable to estimate pose, body shape, or both for input images depicting complex clothing (e.g., loose-fitting clothing that does not conform to the shape of the body, clothing such as jackets or dresses that obscure the outline of the shoulders or the legs, etc.). Because the virtual environment platform cannot distinguish the clothing from the person's body and cannot accurately identify the person's body shape or pose, the virtual environment platform provides sub-optimal results when animating or re-dressing the digital avatar.

Even when existing solutions address the problem of the human being scanned as a single static object, these solutions present additional disadvantages. For example, if a virtual environment platform needs to recognize certain portions of the human body, a user that wishes to generate an avatar from a digital scan of the body must manually identify certain key portions of the body (e.g., knees, elbows, etc.). In another example, existing solutions may provide estimates of only the body shape of a scanned figure or only the pose of the scanned figure, but not both.

Thus, existing solutions for recognizing body shapes, body poses, and other characteristic in input images of human beings or other figures may present disadvantages for reasons such as (but not limited to) those described above.

SUMMARY

Certain embodiments involve recognizing combinations of body shape, pose, and clothing in three-dimensional input images. For example, synthetic training images are generated based on user inputs. These synthetic training images depict different training figures with respective combinations of a body pose, a body shape, and a clothing item. A machine learning algorithm is trained to recognize the pose-shape-clothing combinations in the synthetic training images (e.g., by using depth maps of the synthetic training images, surface normal maps of the synthetic training images, or some combination thereof) and to generate feature descriptors describing the pose-shape-clothing combinations. The trained machine learning algorithm is outputted for use by an image manipulation application. In one example, an image manipulation application uses a feature descriptor, which is generated by the machine learning algorithm, to match an input figure in an input image to an example image based on a correspondence between a pose-shape-clothing combination of the input figure and a pose-shape-clothing combination of an example figure in the example image.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings.

FIG. 14 is a block diagram depicting examples computing systems that perform certain operations described herein, according to certain embodiments.

DETAILED DESCRIPTION

Figure 1:
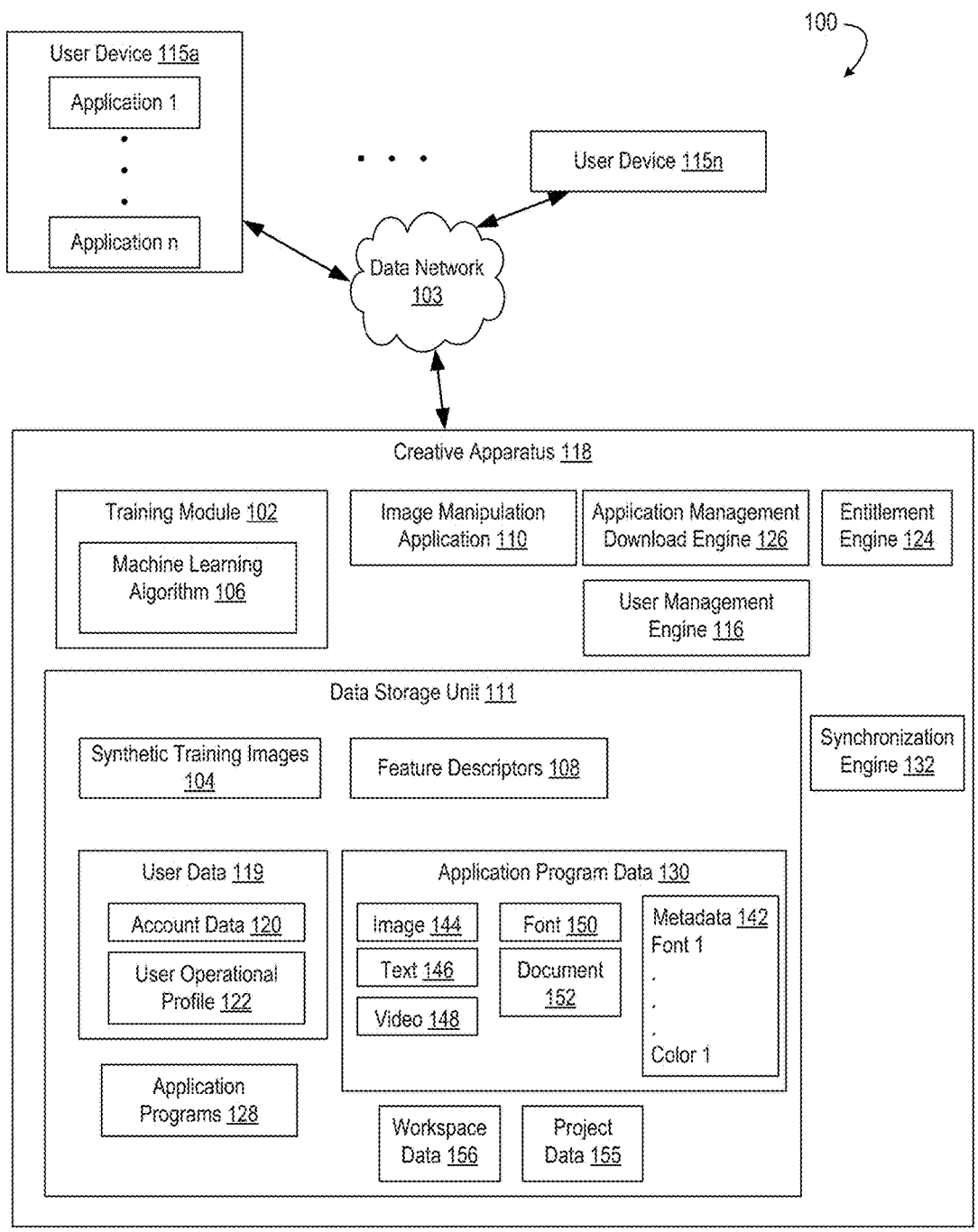
FIG. 1 is a diagram depicting an example of a network environment for recognizing combinations of body shape, pose, and clothing in three-dimensional input images, according to certain embodiments.

The present disclosure includes systems and methods for recognizing combinations of body shape, pose, and clothing in three-dimensional ("3D") input images. As explained above, conventional solutions for recognizing body characteristics in an image (e.g., for the purpose of generating customizable digital avatars) are unable to accurately or automatically distinguish body shape, body pose, and clothing in a 3D input image. Certain embodiments of the present disclosure can more accurately recognize these shape-pose-clothing combinations even if the input image involves complex clothing.

For instance, some embodiments train a machine learning algorithm by using a set of synthetic training images. The machine learning algorithm is trained by configuring a neural network to accurately encode input depth maps, which are generated from the synthetic training images, into feature vectors that have dimensions representing the shape-pose-clothing combinations. The use of depth maps in the neural network allows a useful number of training images with known pose-body-clothing combinations to be synthetically generated, since the resulting depth maps are not affected by certain differences between synthetic training images and "real" images. The trained machine learning algorithm can use the adjusted neural network to decode the feature vectors into output depth maps that accurately correspond to the input depth maps. Once trained, the machine learning algorithm can be used by virtual environment platforms, or other digital applications, to match an input image to a corresponding shape-pose-clothing combination using feature vectors generated from the adjusted neural network.

The following non-limiting example is provided to introduce certain embodiments. A development environment or other suitable application includes an image manipulation application, which is used to generate a set of synthetic training images. Each synthetic training image depicts a particular variation in body shape, pose, and clothing. To generate the synthetic training image, the image manipulation application is used to access a deformable body model (e.g. the Mixamo® body template) and to create different body poses by deforming the body model. The image manipulation application is also used to generate different pose variations by animating each body shape with a suitable motion sequence, where each frame of the motion sequence brings the body model to a different pose. The image manipulation application is also used to "dress" each body shape at each body pose with different clothing items, where the clothing items are digital graphics accessed from a suitable database or other data structure. In some embodiments, the image manipulation application uses a physics-based cloth simulator to enhance the realism of the clothing graphics.

The generated set of synthetic training images is used to train a machine-learning algorithm to learn feature descriptors for the various synthetic training images. For instance, the image manipulation application uses a learning-based approach, such as an auto-encoder network, to map a depth scan of a particular synthetic training image to a corresponding feature vector. As described in greater detail herein with respect to FIGS. 2, 3, and 4, a training process for the machine-learning algorithm causes the trained machine-learning algorithm to recognize pose-shape-clothing combination in a viewpoint-invariant manner. This viewpoint invariance involves generating the same feature descriptor from two depth scans that depict the same person with the same pose and clothing from different viewpoints to retrieve the same nearest examples from the database. An example of a viewpoint is an actual or simulated position of an imaging device with respect to a person or other object being scanned or otherwise imaged. To achieve this viewpoint invariance, the image manipulation application trains the machine-learning algorithm on a subset of synthetic training images with only the viewpoint varied, trains the machine-learning algorithm on another subset of synthetic training images with only the pose varied, etc. By training the machine-learning algorithm in this manner, multiple depth scans can be obtained from each synthetic training image and used to compute a feature descriptor.

The training machine learning algorithm is outputted or otherwise provided to an image manipulation application. Given an input image, the image manipulation application uses the trained machine-learning algorithm to compute a feature descriptor similarly and perform a nearest neighbor search in a database of example images. The image manipulation application uses the trained machine learning algorithm to match a figure in the input image to a corresponding example figure in one of the example images.

For instance, the image manipulation application receives the input image (e.g., by performing a 3D scan of a human being) and uses the trained machine learning algorithm to compute a feature descriptor for the input image. The feature descriptor (e.g., a vector) includes a first set of data describing a pose of the figure in the input image, a second set of data describing a body shape of the figure in the input image, and a third set of data describing one or more clothing items of the figure in the input image. The image manipulation application queries, using the feature descriptor, a database (or other data structure) of example images which depict different body shapes at different poses and with varying clothing. The query retrieves one or more example images from the database that are the most closely matched to the input image. Because the example images are associated with data describing known example pose-shape-clothing combinations, the image manipulation application associates the figure in the input image with a known pose-shape-clothing combination associated with one of the returned example images. In some embodiments, the image manipulation application further optimizes or otherwise modifies the known pose-shape-clothing combination applied to the input figure after identifying the closest example image.

Referring now to the drawings, FIG. 1 is a diagram depicting an example of a network environment for recognizing combinations of body shape, pose, and clothing in 3D input images, according to certain embodiments. In the example depicted in FIG. 1, a training module 102 (or another suitable application) trains the machine learning algorithm 106. The machine learning algorithm uses the user input 202 to create synthetic training images 104, which are used by the training module 102. The training module 102 outputs a trained machine learning algorithm 107, which is a trained version of the machine learning algorithm 106 used by the training module 102.

Figure 4:
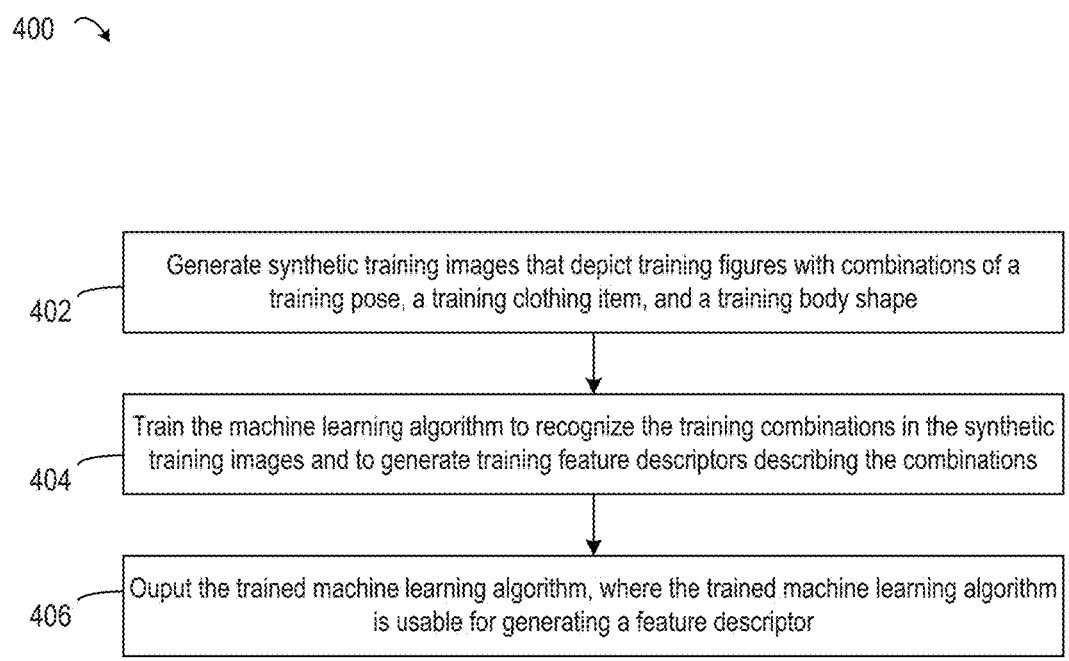
FIG. 4 is a flow chart depicting an example of a method for training a machine learning algorithm to recognize combinations of body shape, pose, and clothing in three-dimensional input images, according to certain embodiments.

FIG. 1 also depicts an image manipulation application 110, which is further described herein respect to FIG. 4. The trained machine learning algorithm 107 is used by an image manipulation application 110 to analyze input images and generate feature descriptors for of estimated combinations of body pose, body shape, and clothing. In some embodiments, the input image is a 3D scan of a person.

In some embodiments, the training module 102 is executed by a creative apparatus 118 using data stored on a data storage unit 111 (e.g., one or more of synthetic training images 104, or feature descriptors 108).

In some embodiments, the environment 100 includes user devices, such as user devices 115a-n. In some embodiments, the training module 102 is executed by the user device 115a, using data stored on a data storage unit (e.g., the data storage unit 111 storing one or more of the synthetic training images 104, the feature descriptors 108), or data stored on another non-transitory computer-readable medium (e.g., a non-transitory computer-readable medium storing one or more of the synthetic training images 104 and the feature descriptors 108).

Each of the user devices 115a-n is connected to either a creative apparatus 118 via a network 103. A user of the user devices uses various products, applications, or services supported by the creative apparatus 118 via the network 103. Examples of the network 103 include, but are not limited to, internet, local area network ("LAN"), wireless area network, wired area network, wide area network, and the like.

The user devices 115a-n correspond to various users. Examples of the users include, but are not limited to, creative professionals or hobbyists who use creative tools to generate, edit, track, or manage creative content, marketing professionals who use marketing tools to generate, edit, track, or manage online content, or to manage online marking processes, end users, administrators, users who use image tools to create, edit, track, or manage images, advertisers, publishers, developers, content owners, content managers, content creators, content viewers, content consumers, designers, editors, any combination of these users, or any other user who uses digital tools to create, edit, track, or manage digital experiences.

Digital tools, as described herein, include a tool that is used to perform a function or a workflow electronically. Examples of a digital tool include, but are not limited to, a creation tool, content editing tool, content publishing tool, content tracking tool, content managing tool, content printing tool, content consumption tool, any combination of these tools, or any other tool that can be used for creating, editing, managing, generating, tracking, consuming or performing any other function or workflow related to content. Digital tools include the creative apparatus 118. Digital experience, as described herein, includes experience that can be consumed through an electronic device. Examples of the digital experience include content creating, content editing, content tracking, content publishing, content posting, content printing, content managing, content viewing, content consuming, any combination of these experiences, or any other workflow or function that can be performed related to content. Content, as described herein, includes electronic content. Examples of content include, but are not limited to, image, video, website, webpage, user interface, menu item, tool menu, magazine, slideshow, animation, social post, comment, blog, data feed, audio, advertisement, vector graphic, bitmap, document, any combination of one or more content, or any other electronic content.

Examples of the user devices include, but are not limited to, a personal computer, tablet computer, a desktop computer, a processing unit, any combination of these devices, or any other suitable device having one or more processors. Each user device includes at least one application supported by the creative apparatus 118. It is to be appreciated that following description is now explained using the user device 115a as an example and any other user device can be used.

The creative apparatus 118 includes one or more engines for providing one or more digital experiences to the user. In some embodiments, these engines include one or more of the engines depicted in FIG. 1. In other embodiments, one or more of the engines depicted in FIG. 1 may be omitted from a creative apparatus 118.

The creative apparatus 118 can be implemented using one or more servers, one or more processing devices, one or more platforms with corresponding application programming interfaces, cloud infrastructure, or the like. In addition, each engine can also be implemented using one or more servers, one or more processing devices, one or more platforms with corresponding application programming interfaces, cloud infrastructure, or the like. The creative apparatus 118 also includes a data storage unit 111. The data storage unit 111 can be implemented as one or more databases or one or more data servers. The data storage unit 111 includes data that is used by the training module 102 and other engines of the creative apparatus 118.

In some embodiments, a user of the user device 115a visits a webpage or an application store to explore applications supported by the creative apparatus 118 (e.g., the training module 102). The creative apparatus 118 provides the applications (e.g., the training module 102) as a software as a service ("SaaS"), or as a standalone application that can be installed on the user device 115a, or as a combination.

In some embodiments, the user creates an account with the creative apparatus 118 by providing user details and by creating login details. Alternatively, the creative apparatus 118 can automatically create login details for the user in response to receipt of the user details. In some aspects, the user is also prompted to install an application manager. The application manager enables the user to manage installation of various applications supported by the creative apparatus 118 and to manage other functionalities, such as updates, subscription account and the like, associated with the applications. The user details are received by a user management engine 116 and stored as user data 119 in the data storage unit 111. In some aspects, the user data 119 further includes account data 120 under which the user details are stored.

In some embodiments, the user either can opt for a trial account or can make payment based on type of account or subscription chosen by the user. Alternatively, the payment can be based on product or number of products chosen by the user. In some embodiments, based on payment details of the user, a user operational profile 122 is generated by an entitlement engine 124. The user operational profile 122 is stored in the data storage unit 111 and indicates entitlement of the user to various products or services. In some embodiments, the user operational profile 122 also indicates type of user, i.e. free, trial, student, discounted, or paid. In some embodiments, the user management engine 116 and the entitlement engine 124 can be one single engine performing the functionalities of both the engines.

In some embodiments, the user installs various applications supported by the creative apparatus 118 via an application download management engine 126. Application installers or application programs 128, which may include a copy of the training module 102 or other software usable with the image to perform operations described herein, are present in the data storage unit 111 and are fetched by the application download management engine 126. These applications are made available to the user directly or via the application manager. In some embodiments, all application programs 128 are fetched and provided to the user via an interface of the application manager. In other embodiments, application programs 128 for which the user is eligible based on user's operational profile are displayed to the user. The user selects the application programs 128, which can include the training module 102, or the applications that the user wants to download. The application programs 128, which can include the training module 102, are downloaded on the user device 115a by the application manager via the application download management engine 126. Corresponding data regarding the download is also updated in the user operational profile 122. An application program 128 is an example of a digital tool. The application download management engine 126 also manages a process of providing updates to the user device 115a.

In some embodiments, upon download, installation and launching of an application program, the user is asked to provide the login details. A check is again made by the user management engine 116 and the entitlement engine 124 to ensure that the user is entitled to use the application program. In other embodiments, direct access is provided to the application program as the user is already logged into the application manager.

The user uses one or more application programs 128, which can include the training module 102, to create one or more projects or assets. In addition, the user also has a workspace within each application program. The workspace, as described herein, includes setting of the application program, setting of tools or setting of user interface provided by the application program, and any other setting or properties specific to the application program. Each user has a workspace. The workspace, the projects or the assets are then stored as application program data 130 in the data storage unit 111 by a synchronization engine 132. The application program data 130 can be specific to the user or can be shared with other users based on rights management.

In some embodiments, the application program data 130 includes one or more assets 140. The assets 140 can be a shared asset which the user wants to share with other users or which the user wants to offer on a marketplace. The assets 140 can also be shared across multiple application programs 128, which can include the training module 102. In some embodiments, each asset includes metadata 142.

In some embodiments, each asset also includes a file. Examples of the file include, but are not limited to, an image 144, text 146, a video 148, a font 150, a document 152, a combination of any of these, and the like. In another aspect, an asset only includes the metadata 142. The application program data 130 also include project data 154 and workspace data 156. In some embodiments, the project data 154 includes the assets 140. In additional or alternative embodiments, the assets 140 are standalone assets. Similarly, the workspace data 156 can be part of the project data 154 in some embodiments and may be standalone data in other embodiments.

In some embodiments, the user can have one or more user devices (e.g., user devices 115a-n). The application program data 130 is accessible by the user from any device (e.g., device 115b), including a device that was not used to create the assets 140 (e.g., device 115c). This is achieved by the synchronization engine 132 that stores the application program data 130 in the data storage unit 111 and makes the application program data 130 available for access by the user or other users via any device. Before accessing the application program data 130 by the user from any other device or by any other user, the user or the other user may need to provide login details for authentication if not already logged in. Else, if the user or the other user is logged in then a newly created asset or updates to the application program data 130 are provided in real time. The workspace data 156 enables the synchronization engine 132 to provide same workspace configuration to the user on any other device or to the other user based on rights management data.

Figure 2:
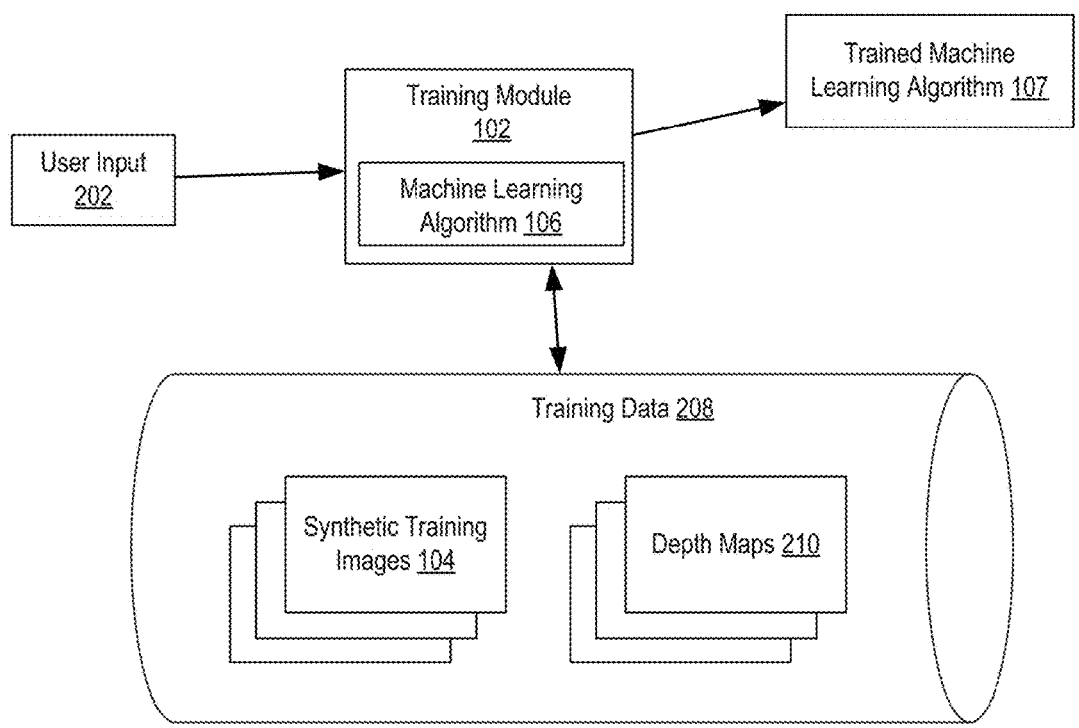
FIG. 2 is a diagram depicting the operation of a training module in which the training module receives user inputs, and outputs a trained matching algorithm, according to certain embodiments.

FIG. 2 is a diagram depicting the operation of a training module 102. The training module 102 provides a trained machine learning algorithm 107, according to certain embodiments. The training module 102 (or other suitable application) receives user inputs 202 that are used to generate synthetic training images 104.

The training module 102 includes program code that is executable by a processing device to perform one or more operations described herein. In some embodiments, training module 102 is a stand-alone application. In other embodiments, the training module 102 includes one or more modules incorporated into another application. The training module 102 may be executed at one or more computing devices, which may be stand-alone computing devices, a set of computing devices configured for cloud computing or other distributed computing, or some combination thereof. (An example of a computing system that can execute the training module 102 is described herein with respect to FIG. 14.)

The training data 208 includes any suitable data structure, such as (but not limited to) a database or set of tables. In the example depicted in FIG. 2, the training data 208 includes synthetic training images 104 and corresponding depth maps 210. In some embodiments, the synthetic training images 104 are stored on a computing device that executes the training module 102. In additional or alternative embodiments, the synthetic training images 104 are accessed via a network by a computing device that executes the training module 102.

A database of these synthetic training images 104 is generated for training the machine learning algorithm 106. These synthetic training images 104 are generated using, for example, a deformable body model that permits variations of one or multiple features of the body (e.g., shape, pose, clothing, etc.) based on user inputs 202. A user input 202 includes, for example, parameters with respect to body pose, body shape, and clothing item that are applied to the deformable body model for generating different synthetic training images 104. The synthetic training images 104 are examples that show variation in body shape, body pose, and clothing.

Figure 3:
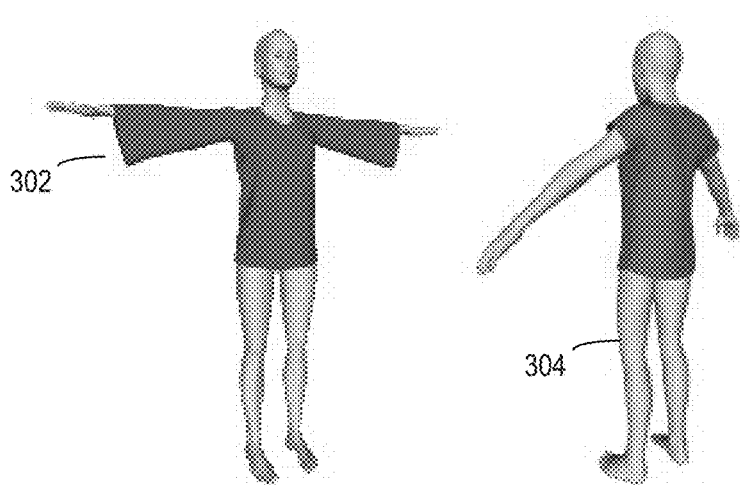
FIG. 3 is a diagram depicting examples of synthetic training images of clothed bodies, according to certain embodiments.

FIG. 3 is a diagram depicting examples of synthetic training images 104. A first synthetic training image 302 and a second synthetic training image 304 depict figures with clothed bodies, according to certain embodiments. In this example, a first synthetic training image 302 includes a body with a pose involving outstretched arms and a long-sleeved shirt. A second synthetic training image 304 includes a body with a pose involving lowered arms and a short-sleeved shirt.

In order to generate these examples, a deformable body model (e.g. the Mixamo® body template) may be used. Body pose variation may be achieved by animating each such body shape in response to user inputs 202 received by the training module 102. Each frame of such an animation may thus depict a different body pose, and thus may be used as an example user input 202. The training module 102 also receives user inputs 202 that specify items of clothing to be applied to the modified body model. For example, a database may contain graphics data describing different clothing items. Suitable user inputs 202 cause the training module 102 to select certain clothing graphics data and apply the graphics data to a modified body model having a certain shape and pose. In some embodiments, a dedicated cloth simulator may be used to synthesize clothing to achieve realistic-looking cloth details.

Returning to FIG. 2, the machine learning algorithm 106 learns, via a training process involving the synthetic training images 104, to discriminate the body pose, body shape, and clothing item. For example, the training module 102 trains the machine learning algorithm 106 to recognize these pose-shape-clothing combinations from the synthetic training images 104. The training module 102 provides depth maps 210, which correspond to respective synthetic training images 104, to the machine learning algorithm 106. The machine learning algorithm 106 generates a feature descriptor for each depth map 210. As described in further detail herein (e.g., with respect to FIG. 5), the machine learning algorithm 106 is iteratively adjusted such that the feature descriptors generated by the machine learning algorithm can accurately reproduce their corresponding depth maps 210 (i.e., by decoding a generate feature vector into an additional depth map). The training module 102 outputs a trained version of the machine learning algorithm 106 (i.e., the trained machine learning algorithm 107) that is capable of generating suitable feature descriptors 108 from input images that may be subsequently received by the trained machine learning algorithm 107.

In some embodiments, using a training process that is based on depth maps allows the machine learning algorithm to be more effectively trained. The effectiveness of a training process can depend on a number of training images and the ability to control variations in the training images. Thus, accurately training a machine learning algorithm to recognize body pose, body shape, and clothing may require a large number of training images with known combinations of body pose, body shape, and clothing. Such a large number of training images with known pose-shape-clothing combinations can be generated using a deformable body model, as described above. Furthermore, the depth map of a synthetically generated training image will not vary significantly from the depth map of a "real" training image (i.e., an image captured with a camera). Thus, a machine learning algorithm may be trained just as effectively using depth maps of synthetic training images as compare to using depth maps of "real" training images. Accordingly, in some embodiments, training a machine learning algorithm 106 based on the depth maps of synthetic training images allows for the generation of feature descriptors (e.g., feature vectors) that accurately describe body shape, body pose, and clothing.

An example of the training process is depicted in FIG. 4. FIG. 4 is a flow chart depicting a method 400 used by the training module 102 to train the machine learning algorithm 106 and output the trained machine learning algorithm 107 (e.g., a trained machine learning algorithm that is usable for creating or modifying digital avatars or for other purposes involving the recognition of body characteristics). In some embodiments, one or more processing devices implement operations depicted in FIG. 4 by executing suitable program code (e.g., the training module 102). For illustrative purposes, the method 400 is described with reference to the examples depicted in FIG. 2. Other implementations, however, are possible.

At block 402, the method 400 involves generating synthetic training images that depict training figures with combinations of a training pose, a training clothing item, and a training body shape. A processing device executes the training module 102 or other suitable application (e.g., a development application, an image manipulation application, etc.) to generate the synthetic training images. For instance, the training module or other suitable application receives user inputs 202 and generates the synthetic training images 104 as described with respect to FIG. 2.

For example, program code for a graphical application, which is stored in a non-transitory computer-readable medium, is executed by one or more processing devices. Executing the graphical application causes the processing device to access one or more deformable body models that are stored in the non-transitory computer-readable medium or a different non-transitory computer-readable medium. In some embodiments, accessing the stored body models involves communicating, via a data bus, suitable signals between a local non-transitory computer-readable medium and the processing device. In additional or alternative embodiments, accessing the stored body models involves communicating, via a data network, suitable signals between a computing system that includes the non-transitory computer-readable medium and a computing system that includes the processing device.

The executed graphical application stores data in a non-transitory computer-readable medium that describes modifications to the deformable body models. For instance, the graphical application modifies data from the body model that describes the body shape of the deformable body model and stores the modified shape data in the non-transitory computer-readable medium. The graphical application also modifies data from the body model that describes the body pose of the deformable body model (e.g., by applying an animation sequence to the body model) and stores the modified pose data in the non-transitory computer-readable medium. The graphical application also accesses graphics data, which is stored in one or more non-transitory computer-readable media, depicting different clothing items, different clothing types, different clothing sets, etc. The graphical application applies the graphics data to the deformable body model, which generates data describing clothing for the body model having the modified shape and pose. The body shape data, body pose data, and clothing data are stored as training data, i.e., a particular synthetic training image in the set of synthetic training images 104.

At block 404, the method 400 involves training the machine learning algorithm 106 to recognize the training combinations in the synthetic training images 104 and to generate training feature descriptors 108 describing the combinations. For instance, one or more processing devices execute the training module 102 and thereby train the machine learning algorithm 106 to recognize the training combinations in the synthetic training images 104 and to generate feature descriptors 108. Program code for the training module 102 is retrieved from a non-transitory computer-readable medium for execution by these processing devices.

In various embodiments, a feature descriptor 108 generated at block 404 includes several components. These components represent, for example, viewpoint, body pose, body shape, and clothing. The feature descriptors 108 facilitate matching characteristics of an input image to an example image. One example of this matching involves matching an input body pose of an input image to an example body pose of an example image. Another example of this matching involves matching an input body shape of an input figure with an example body shape of an example image. Another example of this matching involves matching an input clothing item on an input figure with an example clothing item of an example image.

At block 406, the method 400 involves outputting the trained machine learning algorithm 107. One or more processing devices execute the training module 102 to implement block 402. In some embodiments, the training module 102 outputs the trained machine learning algorithm 107 by providing the trained machine learning algorithm 107 to an image manipulation application 110 or other application that is executed at the same computing system as the training module 102. In additional or alternative embodiments, the training module 102 outputs the trained machine learning algorithm 107 by providing access to the trained machine learning algorithm 107 by an image manipulation application 110 or other application that is executed a computing system that is remote from a computing system at which the training module 102 is executed. For example, the training module 102 provides client devices executing image manipulation applications 110 with access to the trained machine learning algorithm 107 via a data network.

Figure 5:
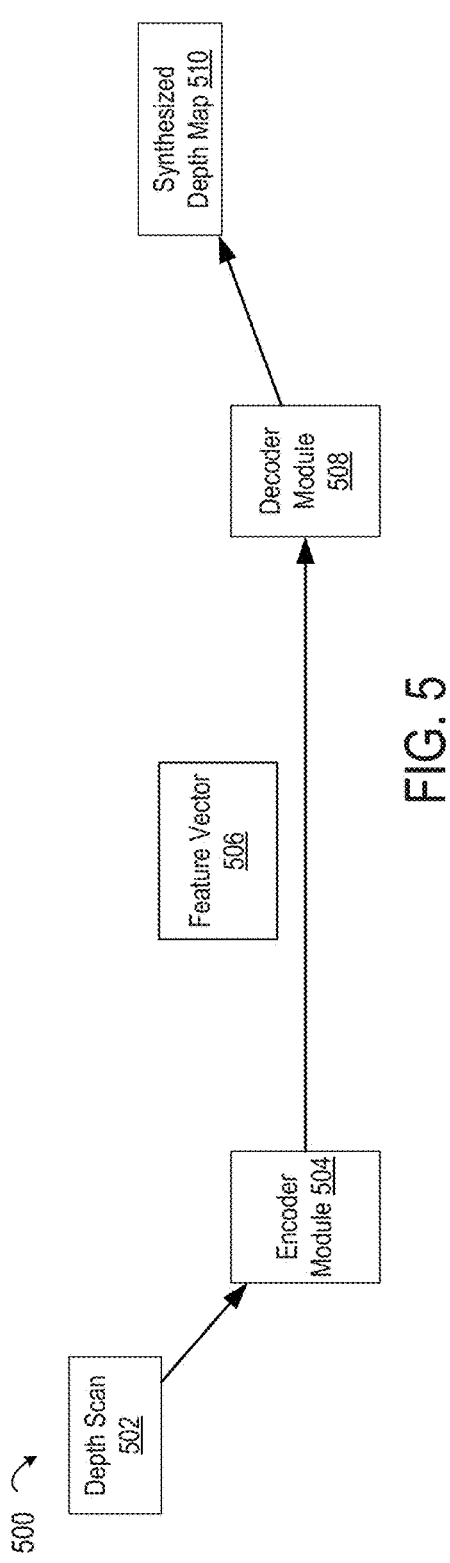
FIG. 5 is a diagram depicting an example of an auto-encoder neural network model that can be used in the method of FIG. 4, according to certain embodiments.

Any suitable process may be used for training a machine learning algorithm in the method 400. For example, FIG. 5 depicts an example in the machine learning algorithm 106 used by the training module 102 is an auto-encoder neural network model 500. The auto-encoder neural network model 500 is trained to learn feature descriptors 108 for synthetic training images. The training process involves iteratively modifying a structure of the auto-encoder neural network model 500 to encode different features of a depth map as dimensions in a feature vector. For example, a training process for the auto-encoder neural network model 500 involves one or more modifications such as (but not limited to) changing the number of nodes in the auto-encoder neural network model 500, changing the number of layers in the auto-encoder neural network model 500, changing one or more mapping functions used in the auto-encoder neural network model 500, changing the number of dimensions included in the feature vector 506 that is extracted by the encoder module 504, adjusting the number of dimensions from the feature vector 506 that are used to encode a certain variation (e.g., body pose, viewpoint, body shape, etc.), modifying connections between layers in auto-encoder neural network model 500 (e.g., adding connections between non-successive layers), etc. The auto-encoder neural network model 500 is thereby configured to detect body shape, body pose, and clothing from a depth map of an input image (e.g., a 3D scan) and to generate a feature descriptor describing the body shape, body pose, and clothing.

Figure 6:
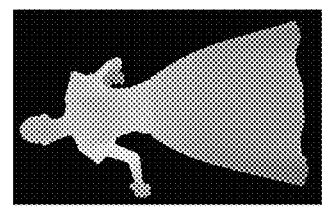
FIG. 6 is an image depicting an example of an input depth map provided to the auto-encoder neural network model of FIG. 5, according to certain embodiments.

The auto-encoder neural network model 500 includes an encoder module 504 and a decoder module 508. The encoder module 504 receives, as input, a 3D depth map 502 (e.g., one of the depth maps 210) for a synthetic training image (e.g., one of the synthetic training images 104). An example of a depth map 502 is depicted in FIG. 6. The encoder module 504 maps the 3D depth map 502 to a feature vector representation of the 3D depth map 502. For example, one or more processing devices execute the encoder module 504 of the training module 102 to receive or otherwise access a depth scan D of a person. The encoder module 504 encodes the depth scan D into a feature representation f. In one example, the feature vector 506 has 1024 dimensions, although any suitable number of dimensions may be used for the feature vector 506.

Figure 7:
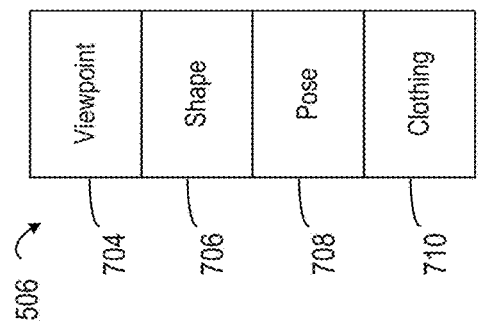
FIG. 7 is a block diagram depicting an example of a feature vector generated by the auto-encoder neural network model of FIG. 5, according to certain embodiments.

FIG. 7 is a block diagram depicting a simplified example of a feature vector 702 generated using the auto-encoder neural network model 500. In this example, a feature vector 702 includes a viewpoint parameter 704 that describes the viewpoint of the depth scan. The feature vector 702 also includes a body shape parameter 706, a body pose parameter 708, and a clothing parameter 710 respectively describing the body shape, pose, and clothing of the person depicted in the depth scan.

Figure 8:
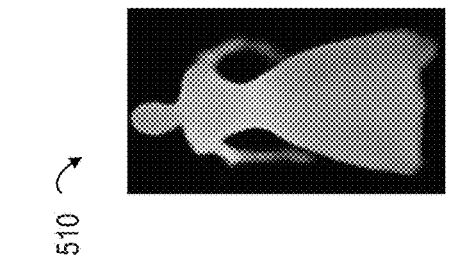
FIG. 8 is an image depicting an example of an output depth map that is synthesized from a feature vector computed with the auto-encoder neural network model of FIG. 5, according to certain embodiments.

Returning to FIG. 5, the decoder module 508 is used to validate a feature vector 506 generated by the encoder module 504. For example, in a validation operation of the training process, the decoder module 508 decodes the feature vector 506 into a synthesized depth map 510. FIG. 8 depicts an example of a synthesized depth map 510 that corresponds to the example of an input depth map 502 depicted in FIG. 6. The synthesized depth map 510 is used to determine the accuracy with which the feature vector 506 represents the input depth map 502 and to adjust the auto-encoder neural network model 500 to improve this accuracy. The auto-encoder neural network model 500 is iteratively configured so that the synthesized depth map 510 is as close as possible to the received depth map 502. For example, one or more processing devices execute the decoder module 508 of the training module 102 and thereby generate an output depth scan, D', from the feature vector f. The auto-encoder neural network model 500 is iteratively adjusted to minimize a loss function $\|D-D'\|$. Minimizing the loss function increases the accuracy with which the feature vector f describes the input depth scan D.

This example of a loss function is provided for illustrative purposes only. Other suitable loss functions may also be used by the auto-encoder neural network model 500. Examples of other loss functions include (but are not limited to) loss functions indicating per-pixel squared differences, loss functions indicating per-pixel differences, or other loss functions used in machine-learning algorithms for determining feature similarity.

In some embodiments, the training process is used to train the machine learning algorithm 106 to generate viewpoint-invariant feature vectors. Viewpoint-invariant feature descriptors permit, for example, a feature descriptor generated for a first image having a first viewpoint to select a corresponding second image having a second viewpoint, where the first and second viewpoints are different from one another. In this manner, a match between an input image and a suitable example image can be identified even if the input image and example image have different viewpoints.

Different subsets of synthetic training images are used to train the machine learning algorithm to recognize body shape, pose, and clothing regardless of viewpoint. For example, a "viewpoint" subset of the synthetic training images includes the same or similar combination of body shape, body pose, and clothing for different training images in the subset and viewpoint variations (i.e., differences in viewpoint) for different training images in the subset. A "shape" subset of the synthetic training images includes the same or similar combination of viewpoint, body pose, and clothing for different training images in the subset and body shape variations (i.e., differences in body shape) for different training images in the subset. A "pose" subset of the synthetic training images includes the same or similar combination of viewpoint, body shape, and clothing for different training images in the subset and body pose variations (i.e., differences in body pose) for different training images in the subset. A "clothing" subset of the synthetic training images includes the same or similar combination of viewpoint, body shape, and body pose for different training images in the subset and clothing variations (e.g., differences in clothing sets, clothing items, clothing types, etc.) for different training images in the subset.

In this example, a training process involves providing each subset of the synthetic training images to the auto-encoder neural network model 500. The auto-encoder neural network model 500 is iteratively adjusted using each subset of synthetic training images. For instance, the first subset of synthetic training images involves a variable viewpoint and fixed pose, shape, and clothing. The training module 102 averages the component of the feature vector corresponding to the fixed property (i.e., the fixed pose, shape, and clothes) in the subset of training images.

In this example involving a variable viewpoint, the training process involves adjusting the auto-encoder neural network model 500 based on a portion of the feature vector being varied. Any suitably sized feature vector may used, and any suitable subset of dimensions from the feature vector may be used to encode a certain variation (e.g., viewpoint, pose, shape, clothing). For instance, 100 dimensions may represent the viewpoint out of a 1024-dimension feature vector in which the various dimensions represent viewpoint, pose, shape, and clothing. In the generation of the feature vector 506, a vector portion representing fixed parameters (i.e. the portion corresponding to the body shape, body pose, and clothing) is set to the average for the synthetic training images in the subset. Variation in the feature vector 506 is allowed for the portion of the feature vector 506 corresponding to the viewpoint parameter. The auto-encoder neural network model 500 is modified such that a "viewpoint" portion of the feature vector 506 can accurately reproduce the viewpoint depicted in a depth map 502 if the feature vector 506 is decoded into a synthesized depth map 510.

This training process is repeated with each other subset of training images in which one parameter (e.g., pose, body shape, and clothing) varies and other parameters remained fixed. Through this iterative training process, the auto-encoder neural network model 500 is modified such that a "pose" portion of the feature vector 506 can accurately reproduce the pose depicted in a depth map 502 if the feature vector 506 is decoded into a synthesized depth map 510, a "shape" portion of the feature vector 506 can accurately reproduce the shape depicted in a depth map 502 if the feature vector 506 is decoded into a synthesized depth map 510, and a "clothing" portion of the feature vector 506 can accurately reproduce the clothing depicted in a depth map 502 if the feature vector 506 is decoded into a synthesized depth map 510. This training process results in auto-encoder neural network model 500 being able to recognize certain changes in one parameter (e.g. pose) and to generate corresponding changes to a component of a feature vector that represent the parameter (e.g., values in the vector corresponding to the pose).

The examples described above involve encoding and decoding depth maps. But other implementations are possible. For instance, in some embodiments, the training module 102 uses surface normal maps to learn and determine different clothing types in a synthetic training image. A surface normal map may permit the training module 102 to train the machine learning algorithm 106 to output a trained machine learning algorithm 107. For example, a surface normal map may include, for each pixel, the coordinates of the surface normal. The encoder module 504 encodes the surface normal map into a feature vector, similar to the description above with respect to depth maps. The decoder module 508 decodes the feature vector into a synthesized surface normal map, similar to the description above with respect to depth maps. A structure of the auto-encoder neural network model 500 (e.g., number of nodes, number of layers, mapping functions, etc.) is iteratively modified to decrease the difference between the synthesized surface normal map and the input surface normal map, similar to the description above with respect to depth maps.

In some embodiments, the input to an auto-encoder neural network model 500 includes both a depth map and a surface map for a given input image. For example, a three-channel image may be derived from an input image, in which the red channel may store the depth map information and the blue and green channels may store the coordinates of the surface normal for the input image. Depth information can be used to train the auto-encoder neural network model 500 (or another suitable machine learning algorithm 106) with respect to viewpoint, pose, and shape. Surface normal information can be used to train the auto-encoder neural network model 500 (or another suitable machine learning algorithm 106) with respect to clothing. In additional or alternative embodiments, a surface normal map may be used for training the auto-encoder neural network model 500 (or another suitable machine learning algorithm 106) if the clothing of a user input 202 is more complex, and a depth map may be used for training the auto-encoder neural network model 500 (or another suitable machine learning algorithm 106) if the clothing of a user input 202 is less complex.

A trained machine learning algorithm 107, which is outputted by the training process described herein, allows for an accurate determination of the body pose and body shape in an input image. For example, the trained learning machine algorithm 107 is capable of generating a feature descriptor used by an image manipulation application 110 to select example images that match an input image. In some embodiments, the feature descriptors generated by the trained learning machine algorithm 107 facilitate accurate and efficient querying of a database of example images. In additional or alternative embodiments, the feature descriptors generated by the trained learning machine algorithm 107 facilitate other operations. For example, parts of a feature descriptor corresponding to certain variations (e.g., pose, shape, etc.) may be provided to other machine learning algorithms that recognize one or more of pose, shape, clothing, etc. for other applications.

Figure 9:
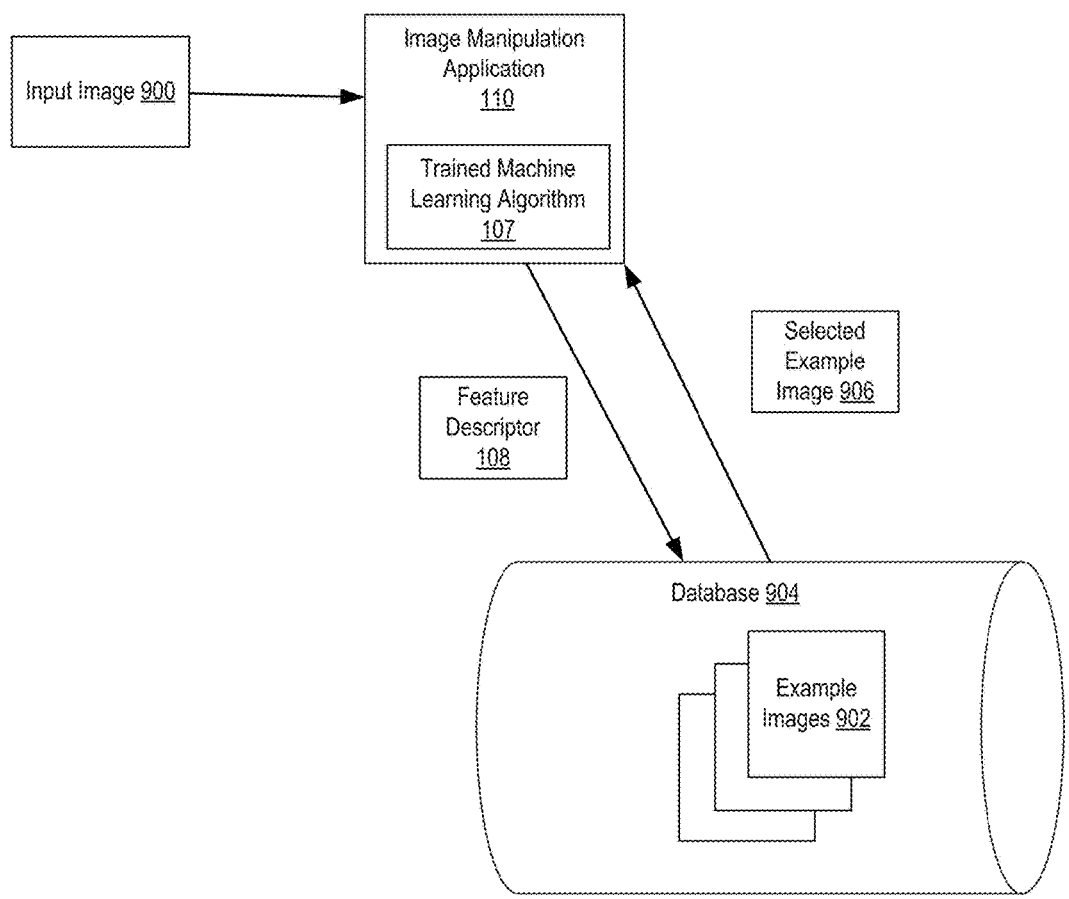
FIG. 9 is a diagram depicting the operation of an image manipulation application in which the image manipulation application uses a trained machine learning algorithm to select an example image, according to certain embodiments.

FIG. 9 is a diagram depicting an example in which an image manipulation application 110 uses a trained machine learning algorithm 107 to match an input image 900 to one or more example images 902. The image manipulation application 110 receives an input image 900. In various embodiments, the input image 900 is received by accessing a non-transitory computer-readable medium on a computing device that executes the image manipulation application 110, by accessing a remote non-transitory computer-readable medium storing the input image 900 via a data network, by communicating with an imaging device that is included in or communicatively coupled to a computing device that executes the image manipulation application 110, etc. The image manipulation application 110 uses the trained machine learning algorithm 107 to recognize one or more features of the input image, such as body shape, body pose, and clothing. Based on this recognition, the image manipulation application 110 computes a feature descriptor 108 from the input image 900. In some embodiments, the image manipulation application 110 uses the computed feature descriptor 108 to query the database 904 in which example images 902 are stored. (Although this example is described using a database, other suitable data structures may be used to store the example images 902.) The example images 902 may be, for example, "real" images captured by various imaging device, synthetically generated images, or some combination thereof. A computing device services the query by selecting one or more of the examples images 902 having matching feature descriptors. One or more selected example images 906 are provided to the image manipulation application 110 in response to the query. In additional or alternative embodiments, the image manipulation application 110 uses the computed feature descriptor 108 to facilitate other operations. For example, parts of a feature descriptor corresponding to certain variations (e.g., pose, shape, etc.) may be used by the image manipulation application 110 in any suitable operation that involves recognizing one or more of pose, shape, clothing, etc.

Figure 10:
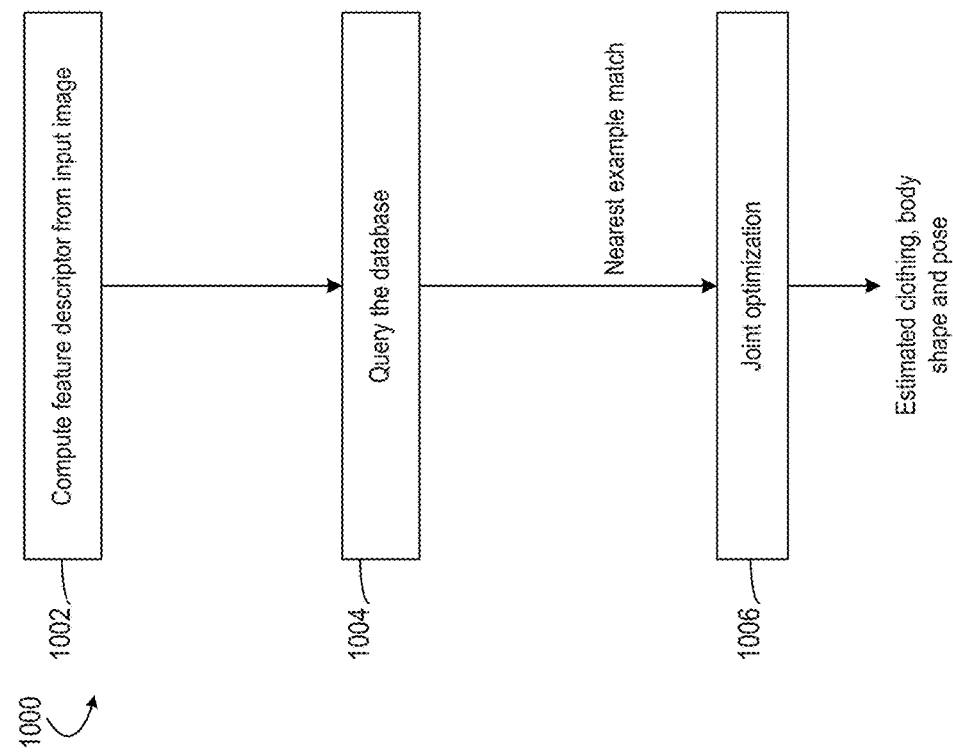
FIG. 10 is a flow chart depicting an example of a method for matching an input image to an example image from a database of examples with varying body pose, shape, and clothing, according to certain embodiments.

FIG. 10 is a flow chart depicting an example of a method for matching an input image to the example image from a database of examples with varying body pose, shape, and clothing, according to certain embodiments. In some embodiments, one or more processing devices implement operations depicted in FIG. 10 by executing suitable program code (e.g., the image manipulation application 110). For illustrative purposes, the method 1000 is described with reference to the examples described herein. Other implementations, however, are possible.

Figure 11:
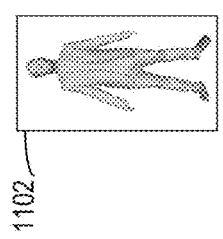
FIG. 11 depicts an example of an input image involved in the method of FIG. 10, according to certain embodiments.

At block 1002, the method 1000 involves computing a feature descriptor 108 for a given input image. The input image may be accessed from a computer readable medium, or by graphical application. An example of the feature descriptor 108 is a vector having multiple components. In some embodiments, the feature descriptor 108 includes a first portion that describes the input body pose, a second portion that describes the input body shape, and a third portion that describes the input clothing item. FIG. 11 is a diagram depicting an example of an input image 1102 received at block 1002.

Figure 12:
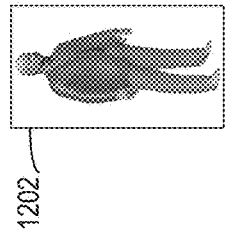
FIG. 12 depicts an example of a matching example image that is selected using the method of FIG. 10, according to certain embodiments.

At block 1004, the method 1000 involves querying a database (or other data structure) storing example images, such as the database 904 depicted in FIG. 9. The method 1000 determines the nearest example match from a database of examples with varying body pose, shape, and clothing for the input image 1102, using the machine learning algorithm 106. The image manipulation application 110 calculates a feature descriptor 108 from the input image received at block 1002. The feature descriptor 108 permits the method 1000 to submit a query to the database and obtain the nearest matching example image from the database. A computing device that maintains the database selects a feature descriptor that matches the query, and the image manipulation application 110 receives the nearest example match. FIG. 12 depicts an example image 1202 that is returned in response to a query using a feature descriptor 108 for the input image 1102.

Figure 13:
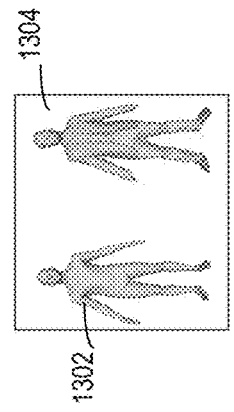
FIG. 13 is a diagram depicting an example in which body shape, body pose, and clothing of an input image are estimated using the method of FIG. 10, according to certain embodiments.

Returning to FIG. 10, at block 1006, the method 1000 involves providing the nearest matching example image to a joint optimization framework in which the parameters of a plausible body shape, body pose, and clothing are adjusted using optimization techniques known in the art. The joint optimization attempts to further refine the match of the nearest example match to further represent the input image. More specifically, the joint optimization process ensures the estimated clothing, body shape, and pose are as accurate with respect to the input image as possible. The method 1000 outputs an estimated body shape, body pose, and clothing. FIG. 13 depicts an example 1302 of the estimated body shape and body pose using the method of FIG. 10 and an example 1304 of the estimate clothing using the method of FIG. 10.

In some embodiments, the image manipulation application 110 accesses data about a retrieved example image that describes the example body shape and the example body pose of an example figure depicted in the retrieved example image. The image manipulation application 110 identifies, based on the example data, differences between the input image and the example image, such as differences between the input body shape and the example body shape, differences between the input body pose and the example body pose, or some combination thereof. The image manipulation application 110 uses a joint optimization framework or other suitable process to modify, based on the identified difference, data describing one or more of the estimate input body shape and the estimated input body pose. The modified data (i.e., the improved estimate of body shape or body pose) is usable for animating the input figure, modifying clothing of the input figure, or performing some other modification of the input figure.

Any suitable computing system or group of computing systems can be used for performing the operations described herein. For example, FIG. 14 is a block diagram depicting example of a computing system 1400 that executes a training module 102 for determining the machine learning algorithm 106, according to certain embodiments.

The depicted example of the computing system 1400 includes one or more processors 1402 communicatively coupled to one or more memory devices 1404. The processor 1402 executes computer-executable program code stored in the memory device 1404, accesses information stored in the memory device 1404, or both. Examples of the processor 1402 include a microprocessor, an application-specific integrated circuit ("ASIC"), a field-programmable gate array ("FPGA"), or any other suitable processing device. The processor 1402 can include any number of processing devices, including one.

The memory device 1404 includes any suitable non-transitory computer-readable medium for storing the training module 102. The computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript.

The computing system 1400 may also include a number of external or internal devices such as input or output devices. For example, the computing system 1400 is shown with an input/output ("I/O") interface 1408 that can receive input from input devices or provide output to output devices. A bus 1406 can also be included in the computing system 1400. The bus 1406 can communicatively couple one or more components of the computing system 1400.

The computing system 1400 executes program code that configures the processor 1402 to perform one or more of the operations described above with respect to FIGS. 1-13. The program code includes, for example, the training module 102 or other suitable applications that perform one or more operations described herein. In some embodiments, the program code includes a graphical application 1405 that perform one or more operations described herein for generating synthetic training images 104 (e.g., deforming a body model, animating a body model, applying clothing data to a body model, etc.). The program code may be resident in the memory device 1404 or any suitable computer-readable medium and may be executed by the processor 1402 or any other suitable processor. In some embodiments, the program code described above is stored in the memory device 1404, as depicted in FIG. 14. In additional or alternative embodiments, the program code described above is stored in one or more memory devices accessible via a data network.

The computing system 1400 can access one or more of the synthetic training images 104 in any suitable manner. In some embodiments, some or all of one or more of the synthetic training images 104 is stored in the memory device 1404, as in the example depicted in FIG. 14. In additional or alternative embodiments, one or more of the synthetic training images 104 is stored in one or more memory devices accessible via a data network.

The computing system 1400 also includes at least one network interface 1410. The network interface 1410 includes any device or group of devices suitable for establishing a wired or wireless data connection to one or more data networks. Non-limiting examples of the network interface 1410 include an Ethernet network adapter, a modem, and/or the like. The computing system 1400 is able to communicate with one or more other computing devices via a data network using the network interface 1410.

In some embodiments, the computing system 1400 includes a presentation device 1412. A presentation device 1412 can include any device or group of devices suitable for providing visual, auditory, or other suitable sensory output. Non-limiting examples of the presentation device 1412 include a touchscreen, a monitor, a speaker, a separate mobile computing device, etc. In some embodiments, the training module 102 configures the presentation device 1412 to present one or more of the synthetic training images 104, or feature descriptors 108, or other results.

FIG. 14 also depicts an example of a computing system 1414 that executes an image manipulation application 110 that uses a trained machine learning algorithm 107. In some embodiments, computing systems 1400, 1414 are separate systems or devices. In additional or alternative embodiments, the same computing system or computing device can execute both the training module 102 and the image manipulation application 110 in accordance with the examples described herein.

The depicted example of the computing system 1414 includes one or more processors 1416 communicatively coupled to one or more memory devices 1418. The processor 1416 executes computer-executable program code stored in the memory device 1418, accesses information stored in the memory device 1418, or both. Examples of the processor 1416 include a microprocessor, an application-specific integrated circuit ("ASIC"), a field-programmable gate array ("FPGA"), or any other suitable processing device. The processor 1416 can include any number of processing devices, including one.

The memory device 1418 includes any suitable non-transitory computer-readable medium for storing the image manipulation application 110. The computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript.

The computing system 1414 may also include a number of external or internal devices such as input or output devices. For example, the computing system 1414 is shown with an input/output ("I/O") interface 1422 that can receive input from input devices or provide output to output devices. A bus 1420 can also be included in the computing system 1414. The bus 1420 can communicatively couple one or more components of the computing system 1414.

The computing system 1414 executes program code that configures the processor 1416 to perform one or more of the operations described above with respect to FIGS. 1-10. The program code includes, for example, the image manipulation application 110 or other suitable applications that perform one or more operations described herein. The program code may be resident in the memory device 1418 or any suitable computer-readable medium and may be executed by the processor 1416 or any other suitable processor. In some embodiments, the program code described above is stored in the memory device 1418, as depicted in FIG. 14. In additional or alternative embodiments, the program code described above is stored in one or more memory devices accessible via a data network.

The computing system 1414 also includes at least one network interface 1424. The network interface 1424 includes any device or group of devices suitable for establishing a wired or wireless data connection to one or more data networks. Non-limiting examples of the network interface 1424 include an Ethernet network adapter, a modem, and/or the like. The computing system 1414 is able to communicate with one or more other computing devices via a data network using the network interface 1424.

In some embodiments, the computing system 1414 includes a presentation device 1426. A presentation device 1426 can include any device or group of devices suitable for providing visual, auditory, or other suitable sensory output. Non-limiting examples of the presentation device 1426 include a touchscreen, a monitor, a speaker, a separate mobile computing device, etc. In some embodiments, the image manipulation application 110 configures the presentation device 1426 to present one or more synthetic training images 104, or feature descriptors 108, or other results.

In some embodiments, the computing system 1414 also includes an imaging device 1428. The imaging device 1428 is used to record or otherwise capture a visual representation of one or more subjects, such as the physical objects within a field of view of the imaging device. In some embodiments, the imaging device 1428 can capture or otherwise generate one or more input images described herein.

EXAMPLES

In some embodiments, a machine learning application described herein can be trained, tested, and used in different ways. FIGS. 15-19 depict various examples of depth maps used to train an auto-encoder neural network model as well as the results of experimental queries that were performed using the auto-encoder neural network model. These examples are described for illustrative purposes only. Other implementations may be used.

Pose-Variation

Figure 15:
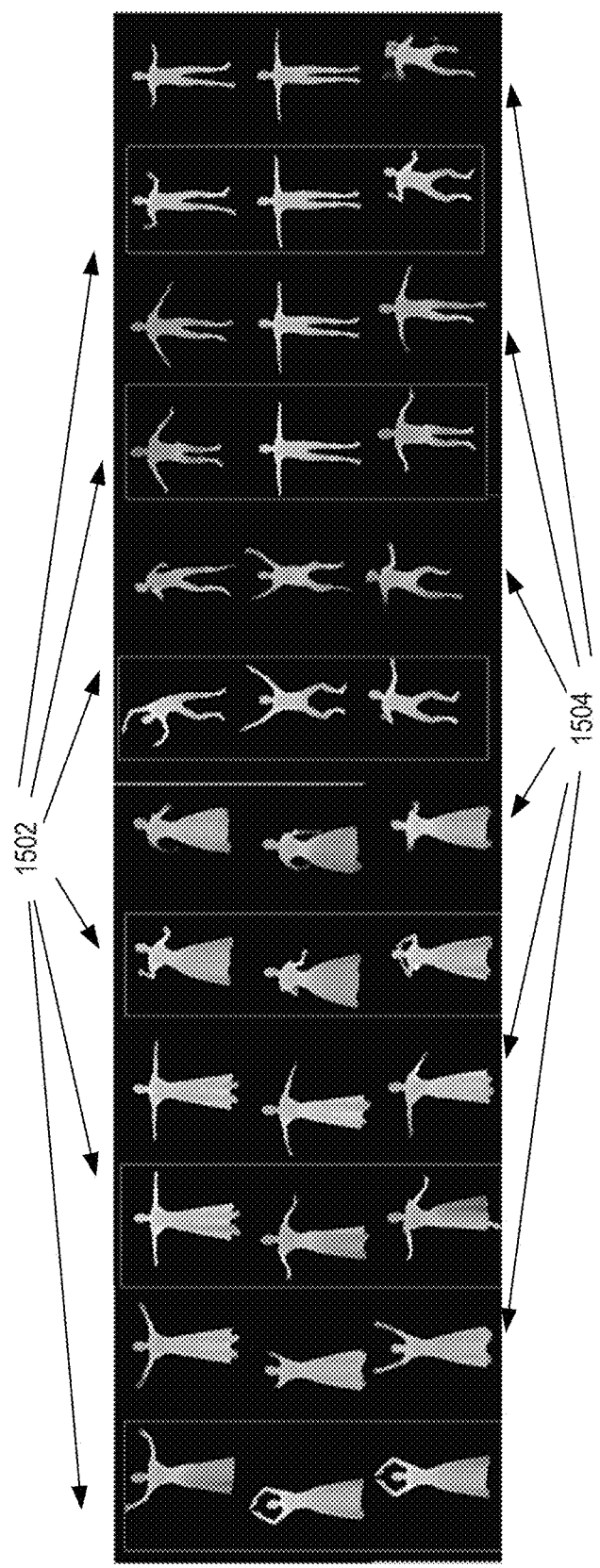
FIG. 15 depicts examples of input depth maps and corresponding synthesized depth maps used in training a machine learning algorithm to identify body shape, body pose, and clothing of an input image, according to certain embodiments.

In one example, an auto-encoder neural network model (e.g., the encoder structure depicted in FIG. 5) was trained using training images having a fixed viewpoint, body shape, and clothing. In this example, variations in body pose were used to train the auto-encoder neural network model, thereby training the auto-encoder neural network model to learn a feature descriptor that describes the body pose. This experiment involved some training images with a simple shirt as the clothing item and other training images with a long dress as the clothing item. The experiment used 14,700 depth maps, which include 10,700 input depth maps used for training an auto-encoder neural network model, 2,000 depth maps used for validating the trained auto-encoder neural network model, and 2,000 depth maps used for testing the trained auto-encoder neural network model. FIG. 15 depicts input depth maps 1502 and corresponding sets of synthesized output depth maps 1504 generated by the auto-encoder neural network model that was trained in this experiment.

Figure 16:
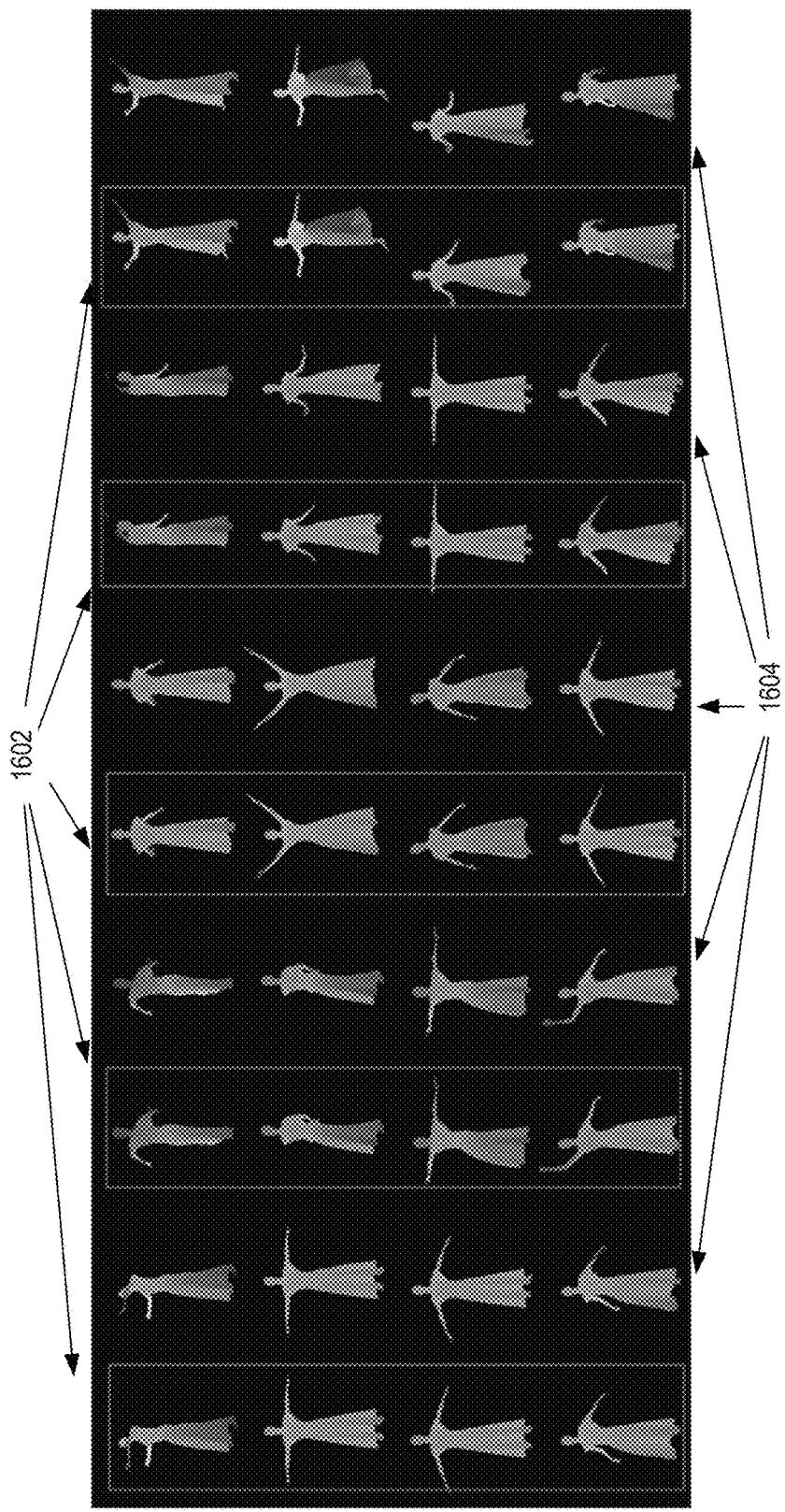

In this example, a database of 1,000 images was used as example images to be queried, and another 1,000 images were used as input images for querying the database. For each query example, a "ground truth result" from the example images was manually identified. A ground truth result was the example image (or corresponding depth map) designated for experimental purposes as the example image to a given input image (or corresponding depth map) used in a query. FIG. 16 shows the query maps 1602, which correspond to the input images used in the experiment, and corresponding example depth maps 1604, which correspond to the nearest example images retrieved from the database using feature descriptors generated with the trained auto-encoder neural network model. 92% of the queries returned the ground truth result as the example image selected from the database.

Figure 17:
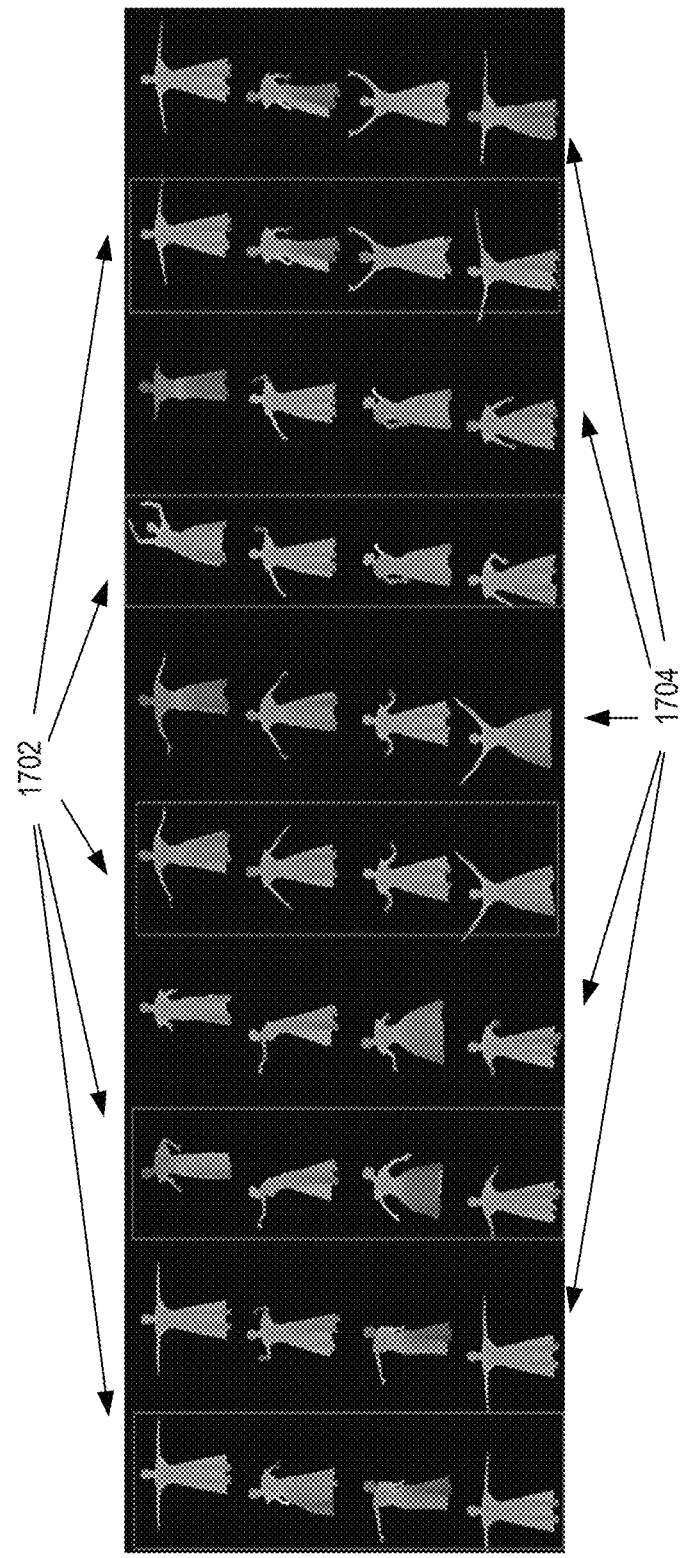
FIG. 17 depicts examples of depth maps used to query a set of example images and depth maps of example images returned by the queries using the machine learning algorithm that is trained with the examples depicted in FIG. 16, according to certain embodiments.

In another example, an experiment involved the same set of queries using a smaller database of 200 example images. As the set of example images decreases, the nearest example images were less similar to the input images. In this experiment, 63.9% of the queries returned example images that were the designated ground truth results. For this example, FIG. 17 shows the query maps 1702, which correspond to input images, and example depth maps 1704, which correspond to the nearest example images retrieved from the database using feature descriptors generated with the trained auto-encoder neural network model.

Figure 18:
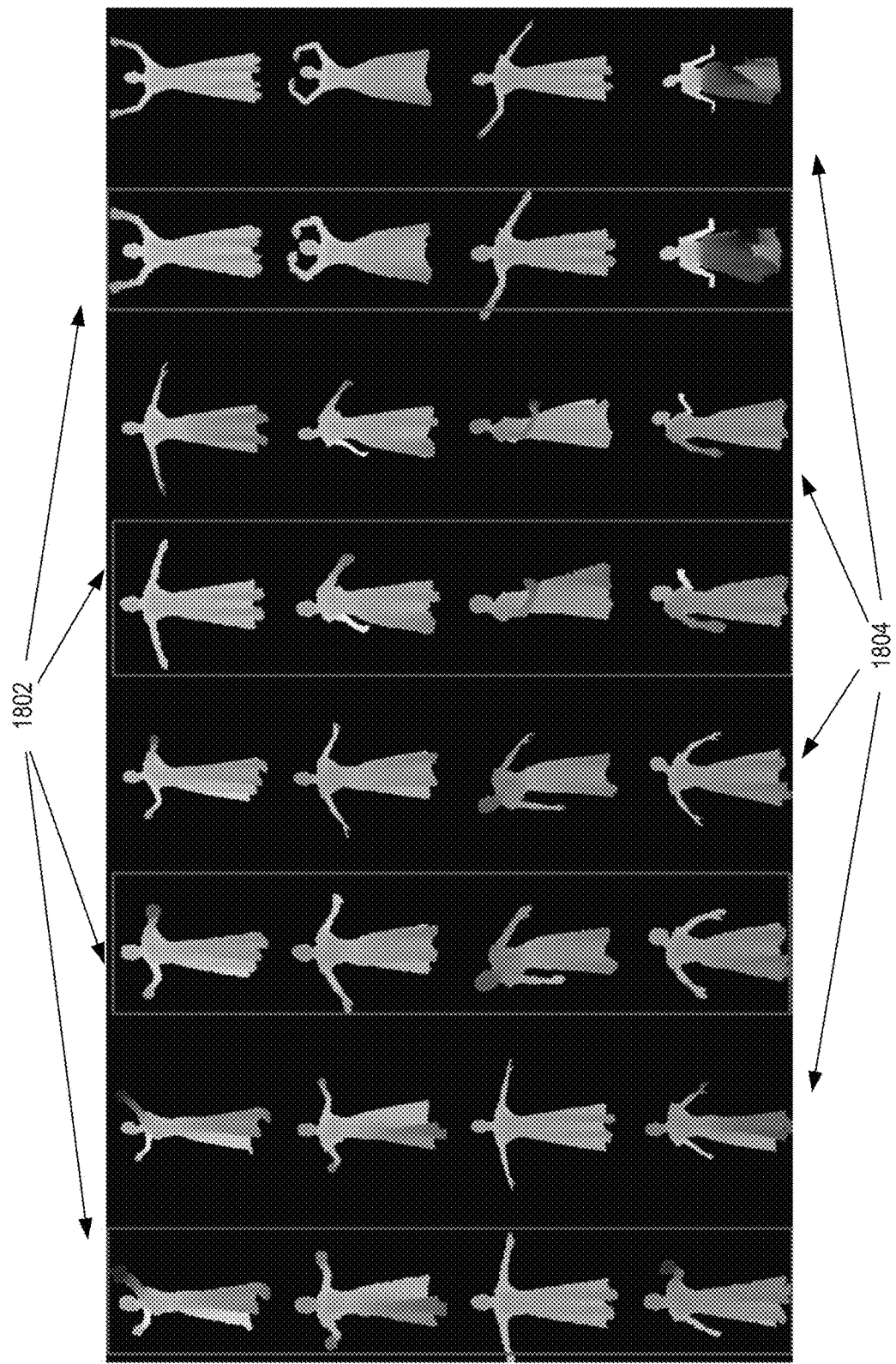
FIG. 18 depicts additional examples of depth maps used to query a set of example images and depth maps of example images returned by the queries using the machine learning algorithm that is trained with the examples depicted in FIG. 16, according to certain embodiments.

In another example, an experiment involved using the same set of queries and gradually adding noise to the query depth maps. Even with [−2.5 cm, 2.5 cm] of noise added, the correct nearest examples (i.e., the ground truth results) were retrieved from a database of 1,000 examples images, corresponding to a success rate of 89.5%. For this example, FIG. 18 shows the sets of query maps 1802, which correspond to input images, and corresponding sets of example depth maps 1804, which correspond to the nearest example images retrieved from the database.

Pose and Viewpoint Variation

In another example, an experiment was conducted involving variations in viewpoint as well as pose. Each synthetic example can be rendered from different viewpoints, and an auto-encoder neural network model can be trained to learn a viewpoint-invariant feature descriptor. The network structure of the auto-encoder neural network model 500 is adjusted such that the encoder module 504 outputs a feature descriptor of length 1024, where the first 256 dimensions describe the viewpoint and the remaining 768 dimensions describe the pose of the input depth map.

Figure 19:
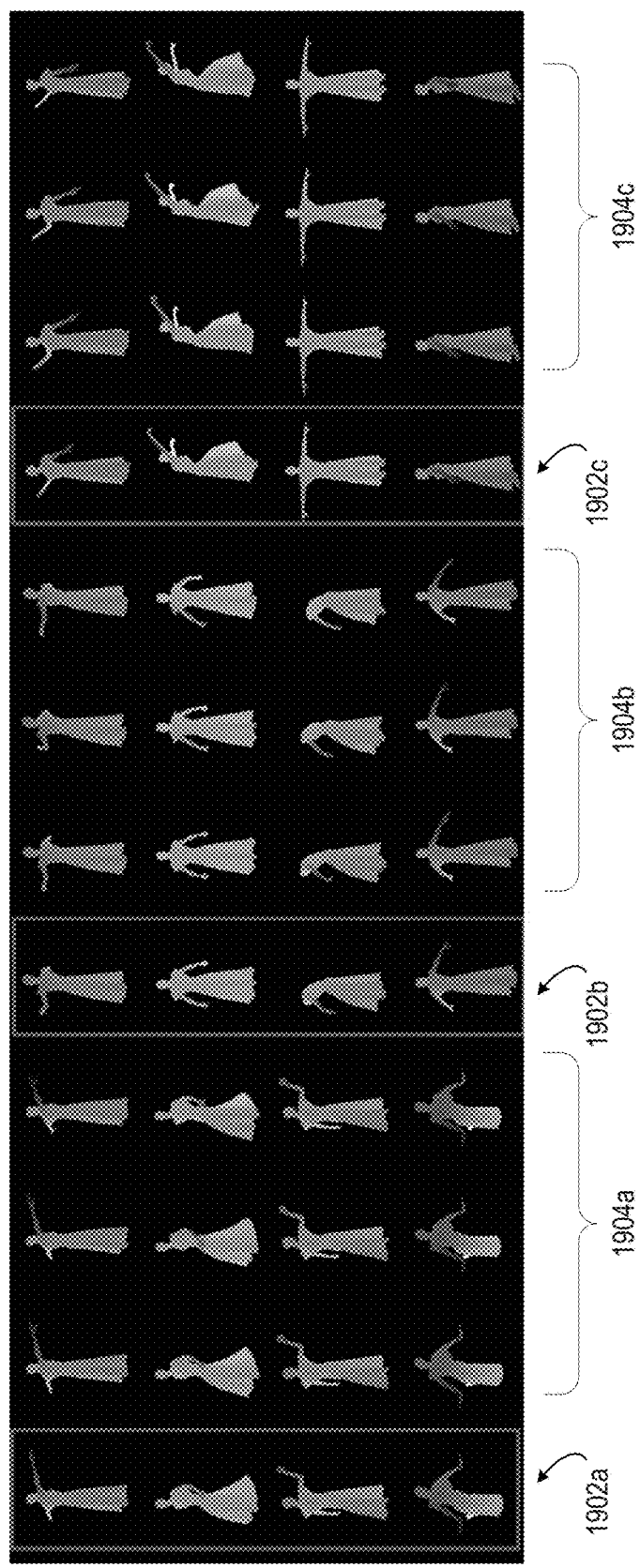
FIG. 19 depicts additional examples of depth maps used to query a set of example images and depth maps of example images returned by the queries using the machine learning algorithm that is trained with the examples depicted in FIG. 16, according to certain embodiments.

In this example, the body shape and clothing remain fixed. The auto-encoder neural network model was trained using 2940 examples, each of which was rendered from one of 24 viewpoints. Of these examples, 400 examples were utilized for validation, 400 examples were used for testing, and the remaining examples were used for training. Using the trained auto-encoder neural network model, feature descriptors were generated and used to query a database of 735 example images. FIG. 19 shows sets of query depth maps 1902*a-c* and corresponding sets 1904*a-c* of the top-three nearest example images that were retrieved using the feature descriptors. Most of these top-three nearest example images depicted the same pose as the input query, but different viewpoints. In some cases, the top three nearest examples also showed slight variation from the input pose.

Pose, Clothing, and Viewpoint Variation

In another example, an experiment was conducted involving variations in clothing. An experiment was configured using six different clothing types. Each query example contained the ground truth result as the closest database example from the same motion sequence. In 74.13% of the queries during the experiment, the query returned the ground truth result as the nearest example image. In 86.18% of the queries during the experiment, the query returned the ground truth result among the top three nearest examples.

In some cases, the resolution of the depth maps was not sufficient to distinguish between different cloth types such as a t-shirt with short and long sleeves. In this experiment, to resolve such issues, each depth map was augmented with additional gradient information of the gray-scale images. This additional information captured the edges (e.g., the contours) of the clothing. The additional gradient information was processed by a physical cloth simulator, which is configured to analyze the nature and details of the clothing on a person depicted in an image. In an experiment involving the additional gradient information, 80.904% of the queries returned the ground truth result as the nearest example image. In 91.641% of the queries, the ground truth result was included among the top three nearest example images that were returned in response to the query.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes poses of example rather than limitation, and does not preclude the inclusion of such modifications, variations, and/or additions to the present subject matter as would be readily apparent to one of ordinary skill in the art.

The invention claimed is:

1. A method for training machine learning algorithms to match input images to example images based on combinations of body shape, body pose, and clothing item, the method comprising:
   accessing, by a processing device, synthetic training images having known combinations of a training body pose, a training clothing item, and a training body shape;
   training, by the processing device, a machine learning algorithm to generate training feature vectors describing the known combinations of the training body pose, the training clothing item, and the training body shape, wherein training the machine learning algorithm comprises:
      selecting a set of the synthetic training images with known body pose variations and known body shape variations,
      generating input depth maps based on clothing depicted in the selected set of synthetic training images,
      accessing a neural network for encoding the input depth maps into the training feature vectors and decoding output depth maps from the training feature vectors, and
      performing an iterative adjustment of the neural network, wherein:
         (a) in a first iteration prior to an adjustment, a first training feature vector encoded by the neural network includes (i) a first set of dimension values for a first set of dimensions representing body pose from the selected set of synthetic training images and (ii) a second set of dimension values for a second set of dimensions representing body shape from the selected set of synthetic training images,
         (b) a first difference value indicates a difference between (i) an input depth map encoded into the first training feature vector and (ii) a first output depth map decoded from the first training feature vector,
         (c) in a second iteration subsequent to the adjustment, a second training feature vector encoded by the neural network includes (i) a first set of modified dimension values for the first set of dimensions representing body pose from the selected set of synthetic training images and (ii) a second set of modified dimension values for the second set of dimensions representing body shape from the selected set of synthetic training images,
         (d) a second difference value indicates a difference between the input depth map and a second output depth map decoded from the second training feature vector, and
         (e) the iterative adjustment of the neural network is completed based on the second difference value being less than the first difference value; and
   outputting, by the processing device, the trained machine learning algorithm for matching (i) an input image having an input body shape and input body pose to (ii) an example image having a known combination of example body shape and example body pose.

2. The method of claim 1, further comprising:
   accessing the input image from a computer-readable medium;
   computing a feature vector from the accessed input image, the feature vector having a first portion that describes the input body pose, a second portion that describes the input body shape, and a third portion that describes an input clothing item in the input image;

generating a query from the feature vector; and selecting the example image from a database using the query.

3. The method of claim 2, wherein the input image comprises a three-dimensional scan of a person, wherein a figure in the input image having the input body pose, the input body shape, and the input clothing item corresponds to the person.

4. The method of claim 2, further comprising:

accessing example data describing an example body shape of an example figure from the example image and an example body pose of the example figure;

identifying, based on the example data, a difference between at least one of:
  (i) the input body shape and the example body shape; or
  (ii) the input body pose and the example body pose;

modifying, based on the identified difference, data describing at least one of the input body shape or the input body pose, wherein the modified data is usable for at least one of animating an input figure in the input image or modifying clothing of the input figure.

5. The method of claim 1, further comprising generating the synthetic training images, wherein generating the synthetic training images comprises, for each synthetic training image:

accessing, with a graphical application, a deformable body model from a computer-readable medium;

modifying, with the graphical application, a body pose of the deformable body model and a body shape of the deformable body model;

accessing, with the graphical application, graphics data depicting clothing items;

applying, with the graphical application, at least some of the graphics data depicting the clothing items to the deformable body model with the modified body pose and the modified body shape; and storing respective training data for the synthetic training image describing the deformable body model with the modified body pose, the modified body shape, and the applied graphics data, wherein the respective training data indicates the respective training combination of the training body pose, the training clothing item, and the training body shape for the synthetic training image.

6. The method of claim 1, wherein training the machine learning algorithm further comprises:

providing the input depth maps to the machine learning algorithm;

encoding, based on the neural network, the input depth maps as feature vectors;

decoding the feature vectors into synthesized depth maps;

modifying a structure of the neural network based on differences between the synthesized depth maps and the input depth maps.

7. The method of claim 1, wherein training the machine learning algorithm comprises:

selecting viewpoint training images, shape training images, pose training images, and clothing training images, wherein:

the viewpoint training images are a first subset of the synthetic training images and include (i) a fixed combination of pose, shape, and clothing and (ii) respective viewpoint variations, the shape training images are a second subset of the synthetic training images and include (i) a fixed combination of viewpoint, shape, and clothing and (ii) respective body shape variations, the pose training images are a third subset of the synthetic training images and include (i) a fixed combination of viewpoint, shape, and clothing and (ii) respective body pose variations, and the clothing training images are a fourth subset of the synthetic training images and include (i) a fixed combination of viewpoint, pose, and shape and (ii) respective clothing variations;

modifying, based on depth maps of the viewpoint training images, a structure of the neural network such that the modified structure of the neural network encodes a viewpoint in a first feature vector portion;

modifying, based on depth maps of the shape training images, the structure of the neural network such that the modified structure of the neural network encodes a body shape in a second feature vector portion;

modifying, based on depth maps of the pose training images, the structure of the neural network such that the modified structure of the neural network encodes a body pose in a third feature vector portion; and modifying, based on surface normal maps of the clothing training images, the structure of the neural network such that the modified structure of the neural network encodes clothing in a fourth feature vector portion.

8. A system comprising:

a non-transitory computer-readable medium storing synthetic training images having known combinations of a training body pose, a training clothing item, and a training body shape;

means for selecting a set of the synthetic training images with known body pose variations and known body shape variations;

means for encoding, via a neural network, input depth maps generated from the selected set of synthetic training images into training feature vectors and decoding output depth maps from the training feature vectors; and means for performing an iterative adjustment of the neural network, wherein:

(a) in a first iteration prior to an adjustment, a first training feature vector encoded by the neural network includes (i) a first set of dimension values for a first set of dimensions representing body pose from the selected set of synthetic training images and (ii) a second set of dimension values for a second set of dimensions representing body shape from the selected set of synthetic training images, (b) a first difference value indicates a difference between (i) an input depth map encoded into the first training feature vector and (ii) a first output depth map decoded from the first training feature vector, (c) in a second iteration subsequent to the adjustment, a second training feature vector encoded by the neural network includes (i) a first set of modified dimension values for the first set of dimensions representing body pose from the selected set of synthetic training images and (ii) a second set of modified dimension values for the second set of dimensions representing body shape from the selected set of synthetic training images, (d) a second difference value indicates a difference between the input depth map and a second output depth map decoded from the second training feature vector, and (e) the iterative adjustment of the neural network is completed based on the second difference value being less than the first difference value; and means for matching, with the iteratively adjusted neural network, an input image having an input body shape and input body pose to an example image having a known combination of example body shape and example body pose.

9. The system of claim 8, wherein the means for matching comprises means for:

accessing the input image from the non-transitory computer-readable medium or another non-transitory computer-readable medium;

computing a feature vector from the accessed input image, the feature vector having a first portion that describes the input body pose, a second portion that describes the input body shape, and a third portion that describes an input clothing item in the input image;

generating a query from the feature vector; and selecting the example image from a database using the query.

10. The system of claim 9, wherein the input image comprises a three-dimensional scan of a person, wherein a figure in the input image having the input body pose, the input body shape, and the input clothing item corresponds to the person.

11. The system of claim 9, further comprising a processing device configured for:

accessing example data describing an example body shape of an example figure from the example image and an example body pose of the example figure;

identifying, based on the example data, a difference between at least one of:

(i) the input body shape and the example body shape; or (ii) the input body pose and the example body pose;

modifying, based on the identified difference, data describing at least one of the input body shape or the input body pose, wherein the modified data is usable for at least one of animating an input figure in the input image or modifying clothing of the input figure.

12. The system of claim 8, further comprising a processing device configured for generating the synthetic training images, wherein generating the synthetic training images comprises, for each synthetic training image:

accessing, with a graphical application, a deformable body model from a computer-readable medium;

modifying, with the graphical application, a body pose of the deformable body model and a body shape of the deformable body model;

accessing, with the graphical application, graphics data depicting clothing items;

applying, with the graphical application, at least some of the graphics data depicting the clothing items to the deformable body model with the modified body pose and the modified body shape; and storing respective training data for the synthetic training image describing the deformable body model with the modified body pose, the modified body shape, and the applied graphics data, wherein the respective training data indicates the respective training combination of the training body pose, the training clothing item, and the training body shape for the synthetic training image.

13. The system of claim 8, wherein iteratively adjusting the neural network comprises, for one or more iterations:

encoding, based on the neural network, the input depth maps as feature vectors;

decoding the feature vectors into synthesized depth maps;

modifying a structure of the neural network based on differences between the synthesized depth maps and the input depth maps.

14. The system of claim 8, wherein iteratively adjusting the neural network comprises, for one or more iterations:

selecting viewpoint training images, shape training images, pose training images, and clothing training images, wherein:

the viewpoint training images are a first subset of the synthetic training images and include (i) a fixed combination of pose, shape, and clothing and (ii) respective viewpoint variations, the shape training images are a second subset of the synthetic training images and include (i) a fixed combination of viewpoint, shape, and clothing and (ii) respective body shape variations, the pose training images are a third subset of the synthetic training images and include (i) a fixed combination of viewpoint, shape, and clothing and (ii) respective body pose variations, and the clothing training images are a fourth subset of the synthetic training images and include (i) a fixed combination of viewpoint, pose, and shape and (ii) respective clothing variations;

modifying, based on depth maps of the viewpoint training images, a structure of the neural network such that the modified structure of the neural network encodes a viewpoint in a first feature vector portion;

modifying, based on depth maps of the shape training images, the structure of the neural network such that the modified structure of the neural network encodes a body shape in a second feature vector portion;

modifying, based on depth maps of the pose training images, the structure of the neural network such that the modified structure of the neural network encodes a body pose in a third feature vector portion; and modifying, based on surface normal maps of the clothing training images, the structure of the neural network such that the modified structure of the neural network encodes clothing in a fourth feature vector portion.

15. A non-transitory computer-readable medium having program code that is stored thereon and that is executable by a processing device for performing operations, the operations comprising:

accessing synthetic training images having known combinations of a training body pose, a training clothing item, and a training body shape;

training a machine learning algorithm to generate training feature vectors describing the known combinations of the training body pose, the training clothing item, and the training body shape, wherein training the machine learning algorithm comprises:

selecting a set of the synthetic training images with known body pose variations and known body shape variations, generating input depth maps based on clothing depicted in the selected set of synthetic training images, accessing a neural network for encoding the input depth maps into the training feature vectors and decoding output depth maps from the training feature vectors, and performing an iterative adjustment of the neural network, wherein:

(a) in a first iteration prior to an adjustment, a first training feature vector encoded by the neural network includes (i) a first set of dimension values for a first set of dimensions representing body pose from the selected set of synthetic training images and (ii) a second set of dimension values for a second set of dimensions representing body shape from the selected set of synthetic training images, (b) a first difference value indicates a difference between (i) an input depth map encoded into the first training feature vector and (ii) a first output depth map decoded from the first training feature vector, (c) in a second iteration subsequent to the adjustment, a second training feature vector encoded by the neural network includes (i) a first set of modified dimension values for the first set of dimensions representing body pose from the selected set of synthetic training images and (ii) a second set of modified dimension values for the second set of dimensions representing body shape from the selected set of synthetic training images, (d) a second difference value indicates a difference between the input depth map and a second output depth map decoded from the second training feature vector, and (e) the iterative adjustment of the neural network is completed based on the second difference value being less than the first difference value; and matching, with the trained machine learning algorithm, (i) an input image having an input body shape and input body pose to (ii) an example image having a known combination of example body shape and example body pose.

16. The non-transitory computer-readable medium of claim 15, wherein the matching comprises:

accessing the input image from a computer-readable medium;

computing a feature vector from the accessed input image, the feature vector having a first portion that describes the input body pose, a second portion that describes the input body shape, and a third portion that describes an input clothing item in the input image;

generating a query from the feature vector; and selecting the example image from a database using the query.

17. The non-transitory computer-readable medium of claim 16, the operations further comprising:

accessing example data describing an example body shape of an example figure from the example image and an example body pose of the example figure;

identifying, based on the example data, a difference between at least one of:

(i) the input body shape and the example body shape; or (ii) the input body pose and the example body pose;

modifying, based on the identified difference, data describing at least one of the input body shape or the input body pose, wherein the modified data is usable for at least one of animating an input figure in the input image or modifying clothing of the input figure.

18. The non-transitory computer-readable medium of claim 15, the operations further comprising generating the synthetic training images, wherein generating the synthetic training images comprises, for each synthetic training image:

accessing, with a graphical application, a deformable body model from a computer-readable medium;

modifying, with the graphical application, a body pose of the deformable body model and a body shape of the deformable body model;

accessing, with the graphical application, graphics data depicting clothing items;

applying, with the graphical application, at least some of the graphics data depicting the clothing items to the deformable body model with the modified body pose and the modified body shape; and storing respective training data for the synthetic training image describing the deformable body model with the modified body pose, the modified body shape, and the applied graphics data, wherein the respective training data indicates the respective training combination of the training body pose, the training clothing item, and the training body shape for the synthetic training image.

19. The non-transitory computer-readable medium of claim 15, wherein training the machine learning algorithm further comprises:

providing the input depth maps to the machine learning algorithm;

encoding, based on the neural network, the input depth maps as feature vectors;

decoding the feature vectors into synthesized depth maps;

modifying a structure of the neural network based on differences between the synthesized depth maps and the input depth maps.

20. The non-transitory computer-readable medium of claim 15, wherein training the machine learning algorithm comprises:

selecting viewpoint training images, shape training images, pose training images, and clothing training images, wherein:

the viewpoint training images are a first subset of the synthetic training images and include (i) a fixed combination of pose, shape, and clothing and (ii) respective viewpoint variations, the shape training images are a second subset of the synthetic training images and include (i) a fixed combination of viewpoint, shape, and clothing and (ii) respective body shape variations, the pose training images are a third subset of the synthetic training images and include (i) a fixed combination of viewpoint, shape, and clothing and (ii) respective body pose variations, and the clothing training images are a fourth subset of the synthetic training images and include (i) a fixed combination of viewpoint, pose, and shape and (ii) respective clothing variations;

modifying, based on depth maps of the viewpoint training images, a structure of the neural network such that the modified structure of the neural network encodes a viewpoint in a first feature vector portion;

modifying, based on depth maps of the shape training images, the structure of the neural network such that the modified structure of the neural network encodes a body shape in a second feature vector portion;

modifying, based on depth maps of the pose training images, the structure of the neural network such that the modified structure of the neural network encodes a body pose in a third feature vector portion; and modifying, based on surface normal maps of the clothing training images, the structure of the neural network such that the modified structure of the neural network encodes clothing in a fourth feature vector portion.

* * * * *